US011518625B2

(12) United States Patent
Komoda et al.

(10) Patent No.: US 11,518,625 B2
(45) Date of Patent: Dec. 6, 2022

(54) HANDLING DEVICE, CONTROL DEVICE, AND HOLDING METHOD

(71) Applicant: Kabushiki Kaisha Toshiba, Minato-ku (JP)

(72) Inventors: Kazuma Komoda, Kawasaki (JP); Seiji Tokura, Kawasaki (JP); Haruna Eto, Kawasaki (JP); Ping Jiang, Ota (JP); Atsushi Sugahara, Kawasaki (JP); Akihito Ogawa, Fujisawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 311 days.

(21) Appl. No.: 16/802,723

(22) Filed: Feb. 27, 2020

(65) Prior Publication Data

US 2021/0078811 A1    Mar. 18, 2021

(30) Foreign Application Priority Data

Sep. 13, 2019   (JP) .............................. JP2019-167458

(51) Int. Cl.
*B65G 47/91* (2006.01)
*B25J 9/16* (2006.01)
(Continued)

(52) U.S. Cl.
CPC .......... *B65G 47/917* (2013.01); *B25J 9/1669* (2013.01); *B25J 15/0616* (2013.01); *B65G 57/04* (2013.01)

(58) Field of Classification Search
CPC ... B25J 9/10; B25J 9/1612; B25J 9/163; B25J 9/1666; B25J 9/1669; B25J 15/0616; B65G 47/917; B65G 61/00; B65G 57/04
See application file for complete search history.

(56) References Cited

U.S. PATENT DOCUMENTS 9,821,458 B1 * 11/2017 Watts ..................... B25J 9/1612
9,984,291 B2 * 5/2018 Okazaki ................... G06T 7/75
(Continued)

FOREIGN PATENT DOCUMENTS

JP   2015-112664 A   6/2015
JP   2019-162684 A   9/2019
(Continued)

OTHER PUBLICATIONS

Vahrenkamp Nikolaus et al., "Manipulability Analysis", 2012 12th IEEE-RAS International Conference On Humanoid Robots (Humanoids 2012), IEEE, XP032521253, Nov. 29, 2012, pp. 568-573.
(Continued)

*Primary Examiner* — Gregory W Adams
(74) *Attorney, Agent, or Firm* — Oblon, McClelland, Maier & Neustadt, L.L.P.

(57) ABSTRACT

A handling device according to an embodiment has an arm, a holder, a storage, and a controller. The arm includes at least one joint. The holder is attached to the arm and is configured to hold an object. The storage stores a function map including at least one of information about holdable positions of the holder and information about possible postures of the holder. The detector is configured to detect information about the object. The controller is configured to generate holdable candidate points on the basis of the information detected by the detector, to search the function map for a position in an environment in which the object is present, the position being associated with the generated holdable candidate points, and to determine a holding posture of the holder on the basis of the searched position. The function map associates a manipulability with each position in the environment in which the object is present. The manipulability is a parameter calculated from at least one joint angle of the holder.

7 Claims, 20 Drawing Sheets

(51) Int. Cl.
*B25J 15/06* (2006.01)
*B65G 57/04* (2006.01)

(56) References Cited

U.S. PATENT DOCUMENTS

| | | | | |
|---|---|---|---|---|
| 2005/0226711 | A1* | 10/2005 | Schnoor | B65G 61/00 414/736 |
| 2007/0293986 | A1* | 12/2007 | Nagatsuka | B25J 9/1671 700/245 |
| 2014/0025197 | A1* | 1/2014 | Mattern | B25J 13/08 700/218 |
| 2014/0277721 | A1* | 9/2014 | Tomo | B25J 9/1612 414/752.1 |
| 2015/0127162 | A1* | 5/2015 | Gotou | B25J 9/1612 700/259 |
| 2016/0221187 | A1* | 8/2016 | Bradski | G06V 10/60 |
| 2017/0368693 | A1* | 12/2017 | Chinatalapalli Patta | B25J 15/0616 |
| 2019/0283241 | A1 | 9/2019 | Eto et al. | |
| 2019/0283249 | A1 | 9/2019 | Komoda et al. | |

FOREIGN PATENT DOCUMENTS

| | | |
|---|---|---|
| JP | 2019-162685 A | 9/2019 |
| WO | WO 2008/146930 A1 | 12/2008 |

OTHER PUBLICATIONS

Vahrenkamp Nikolaus et al., "Representing the Robot's Workspace Through Constrained Manipulability Analysis", Autonomous Robots, Kluwer Academic Publishers, Dordrecht, NL, XP035423516, vol. 38, No. I, Jul. 10, 2014, pp. 17-30.

Zacharias et al. "Capturing robot workspace structure: representing robot capabilities", 2007 IEEE/RSJ International Conference on Intelligent Robots and Systems, 2007, pp. 3229-3236.

* cited by examiner

FIG. 10

| POSITION NUMBER | HAND POSITION AND POSTURE | ARM MOVABLE REGION | JOINT ANGLE |
|---|---|---|---|
| 1 | | | |
| 2 | | | |
| 3 | | | |
| ... | | | |

HANDLING DEVICE, CONTROL DEVICE, AND HOLDING METHOD

CROSS-REFERENCE TO RELATED APPLICATION

This application is based upon and claims the benefit of priority from Japanese Patent Application No. 2019-167458, filed on Sep. 13, 2019; the entire contents of which are incorporated herein by reference.

FIELD

Embodiments described herein relate generally to a handling device, a control device, and a holding method.

BACKGROUND

For automating transfer operations at logistics sites, it is required that objects having various shapes, sizes, and weights can be gripped. When these objects are held using a robot, there is a method of holding surfaces of the objects, for example, by sucking them with a suction pad. In order to grip a small and lightweight workpiece, an end effector including one pad is desirable. In particular, it is possible to access a restricted region by offsetting a tip of a robot hand. However, since a link length increases due to the offset of the hand, restrictions such as limitation to a range of possible postures occur. For this reason, there is a problem that it is required to establish a strategy in which positions and postures of a robot during holding operations are considered on the basis of a holding plan that defines a hand mechanism and a holding method which are appropriate for a target region.

BRIEF DESCRIPTION OF THE DRAWINGS

FIG. 10 is a diagram showing a configurational example of a manipulability map according to the embodiment.

FIG. 14 is a diagram for explaining an example in which a surface shape primitive is defined and only a posture of a characteristic surface shape is searched for.

DETAILED DESCRIPTION

A handling device according to an embodiment has an arm, a holder, a storage, and a controller. The arm includes at least one joint. The holder is attached to the arm and is configured to hold an object. The storage stores a function map including at least one of information about holdable positions of the holder and information about possible postures of the holder. The detector is configured to detect information about the object. The controller is configured to generate holdable candidate points on the basis of the information detected by the detector, to search the function map for a position in an environment in which the object is present, the position being associated with the generated holdable candidate points, and to determine a holding posture of the holder on the basis of the searched position. The function map associates a manipulability with each position in the environment in which the object is present. The manipulability is a parameter calculated from at least one joint angle of the holder.

Hereinafter, a handling device, a control device, and a holding method of an embodiment will be described with reference to the drawings. In the following description, constituents having the same or similar functions will be denoted by the same reference signs. Repetitive descriptions for those constituents may be omitted. The expression "based on XX" in the present application means a case "based on at least XX", and may include a case based on other elements in addition to XX. The expression "based on XX" is not limited to a case in which XX is used directly, and may also include a case of being based on something obtained by calculating or processing XX. The term "XX" is an arbitrary element (for example, arbitrary information).

Figure 1:
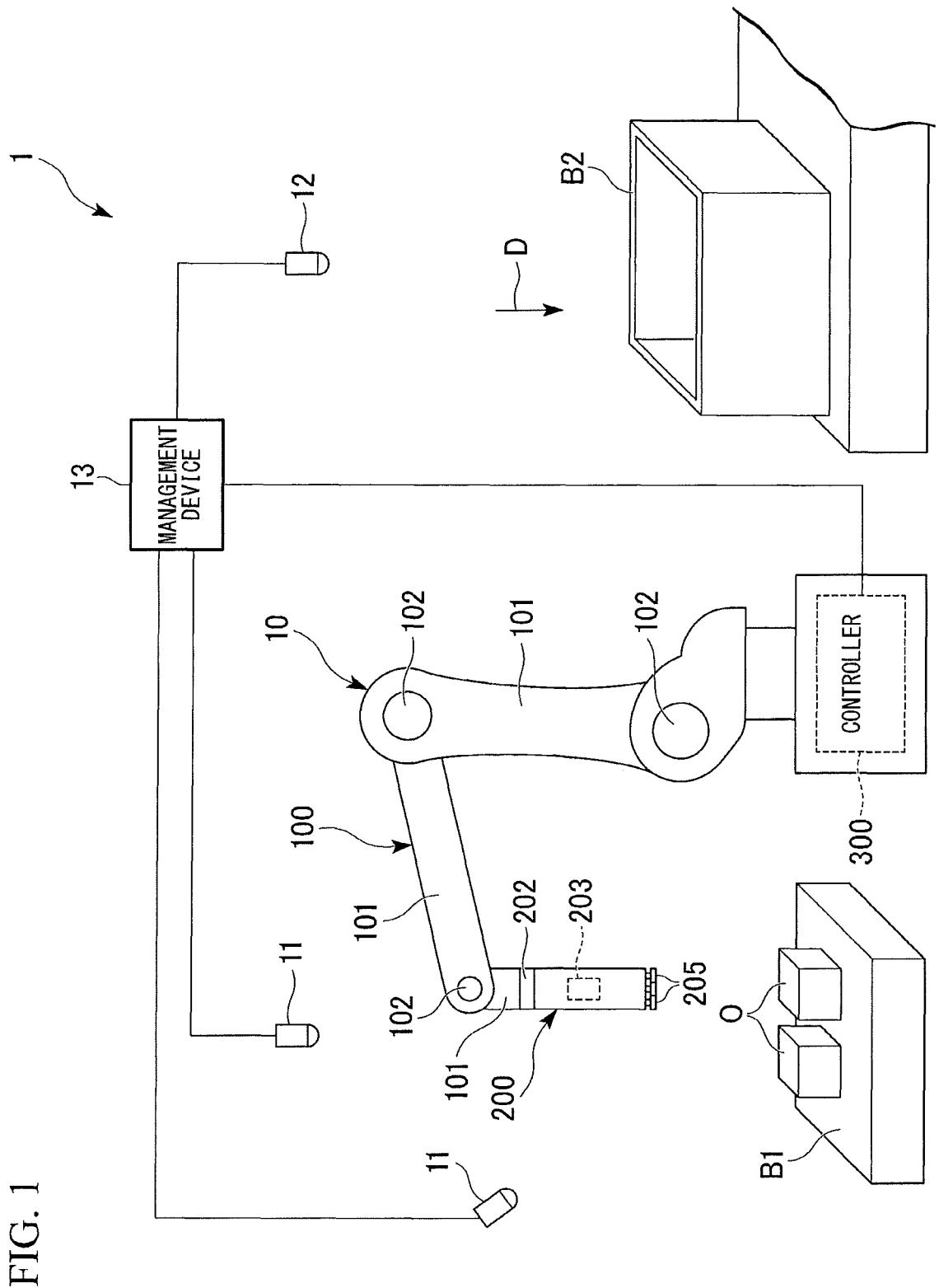
FIG. 1 is a diagram schematically showing a transfer system including a handling device according to an embodiment.

FIG. 1 is a diagram schematically showing a transfer system 1 including a handling device 10 of the present embodiment. As shown in FIG. 1, the transfer system 1 includes the handling device 10, one or more first detectors 11, one or more second detectors 12, and a management device 13. The handling device 10 includes a moving mechanism 100, a holder 200, and a controller 300. The moving mechanism 100 includes a plurality of arm members 101 and a plurality of rotators 102 that rotatably connect the plurality of arm members 101 to each other. The holder 200 includes a suction device 203 and a suction unit 205.

Next, an overview of the transfer system 1 and an overview of operations of the transfer system 1 will be described.

The transfer system 1 is, for example, a handling system (a picking system) for logistics. The transfer system 1 moves objects (holding targets or transfer targets) O positioned at a movement source B1 to a movement destination container B2.

The movement source B1 may be, for example, various conveyors, various pallets, containers such as totes, bottles, and foldable-containers, or the like, but is not limited thereto. Various types of objects O having different sizes and weights are randomly placed at the movement source B1. In the present embodiment, the objects O that are holding targets vary, for example, from 5 cm square to 30 cm square. The objects O vary, for example, from several tens g to several kg. However, sizes and weights of the objects O are not limited to these examples.

The movement destination container B2 may be, for example, containers such as totes or foldable-containers, but is not limited thereto. The term "container" broadly means a member (for example, a box-shaped member) that can accommodate the objects O. However, the handling device 10 and the transfer system 1 may move the objects O to the movement destination container B2 other than a container.

Next, a configuration of the transfer system 1 will be described.

The handling device 10 is, for example, a robot device, holds the object O positioned at the movement source B1, and moves the held object O to the movement destination container B2. The handling device 10 can communicate with the management device 13 in a wired or wireless manner.

First, the handling device 10 will be described.

The moving mechanism 100 is a mechanism that moves the holder 200 to a desired position. The moving mechanism 100 is, for example, a six-axis vertical articulated robot arm. However, the moving mechanism 100 may be, for example, a three-axis orthogonal robot arm, or may be a mechanism that moves the holder 200 to a desired position with another configuration. The moving mechanism 100 includes a sensor or the like for detecting a joint angle of each joint.

The holder 200 is a holding mechanism that holds the object O positioned at the movement source B1, and is, for example, a robot hand. When the moving mechanism 100 is a six-axis vertical articulated robot arm, the holder 200 is vertically offset from a six-axis flange surface of the moving mechanism 100. The holder 200 is connected to the moving mechanism 100 via a rotator 202 which will be described later. The holder 200 holds the object O by suction using, for example, a suction pad. However, the holder 200 may be a holder that holds the object O by pinching the object O with a plurality of pinching members, or may be a holder that holds the object O with another mechanism. Hereinafter, an example in which the holder 200 includes the suction unit 205 will be described. For example, a diameter of a suction pad capable of sucking a 5 cm square object O is 4 cm, for example. The holder 200 includes a sensor for detecting a rotation angle of the holder 200, a sensor for detecting whether or not suction is performed, and the like.

The first detector 11 is a sensor disposed near the movement source B1 (for example, directly above or obliquely above the movement source B1). The sensor is, for example, an RGB-D sensor, a camera, a contact sensor, a distance sensor, or the like. The first detector 11 acquires, for example, information about the object O positioned at the movement source B1 and information about the movement source B1. The information acquired by the first detector 11 includes, for example, at least one of "image data," "distance image data," and "shape data." The "distance image data" is image data having distance information in one or more directions (for example, depth information from an arbitrary reference plane set above the movement source B1). The "shape data" is information indicating an outer shape of the object O and the like. The information detected by the first detector 11 is output to the management device 13. The first detector 11 may be provided as a part of the handling device 10. In this case, the information detected by the first detector 11 may be directly output to the controller 300 of the handling device 10.

The second detector 12 is a sensor disposed near the movement destination container B2 (for example, directly above or obliquely above the destination container B2). The sensor is, for example, an RGB-D sensor, a camera, a contact sensor, a distance sensor, or the like. The second detector 12 detects, for example, information about a shape of the movement destination container B2 (including shapes of an inner wall surface and a partition thereof) and information about the object O previously placed in the destination container B2. The information acquired by the second detector 12 includes, for example, at least one of "image data," "distance image data," and "shape data." The second detector 12 may be provided as a part of the handling device 10. In this case, the information detected by the second detector 12 may be directly output to the controller 300 of the handling device 10.

The management device 13 performs overall management and control of the transfer system 1. For example, the management device 13 acquires information detected by the first detector 11 and the second detector 12, and outputs the acquired information to the controller 300 of the handling device 10.

The handling device 10 and the transfer system 1 are not limited to a handling system for logistics, and can be widely applied to an industrial robot system and other systems. The terms "handling device," "transfer system," and "holding method" as used in the present application are not limited to a device, a system, and a method that mainly aim to transfer an object, and also include a device, a system, and a method that involve transfer (movement) of an object as part of product assembly or another purpose.

Figure 2:
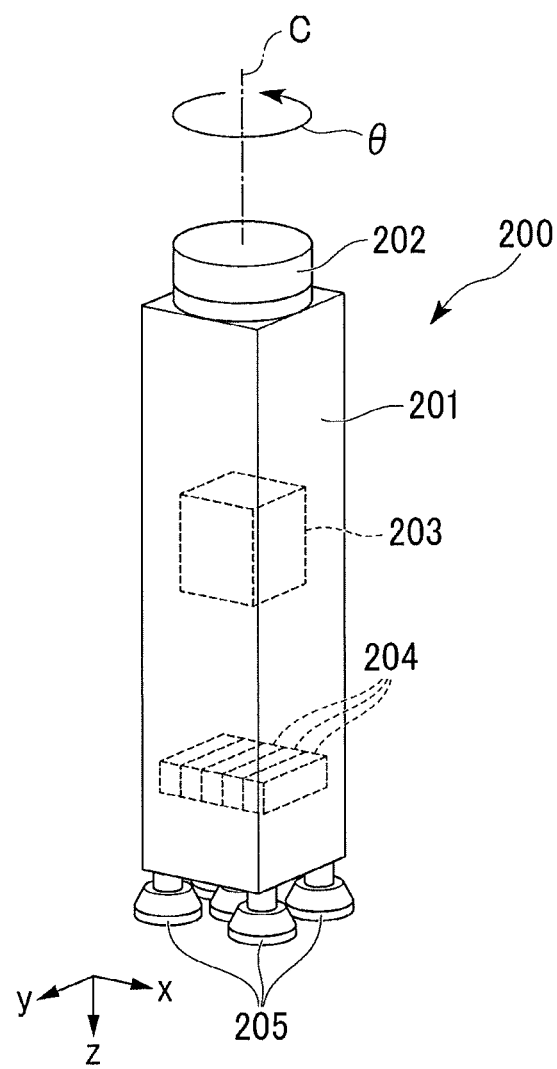
FIG. 2 is a perspective view showing a holder according to the embodiment.

FIG. 2 is a perspective view showing the holder 200 of the present embodiment. The holder 200 includes, for example, a base 201, the rotator 202, the suction device 203, a switching valve 204, and the suction unit 205 (for example, suction pads). The holder 200 may include a plurality of switching valves 204 and a plurality of suction units 205. In the following description, a hand coordinate system of the holder 200 is (x, y, z). In the hand coordinate system of the holder 200, for example, a vertical direction is set as a z-axis direction, a depth direction is set as an x-axis direction, and a lateral direction with respect to a paper sheet is set as a y-axis direction.

The base 201 has, for example, a cubic-shaped outer shape, and forms an outline of the holder 200. The base 201 is connected to the moving mechanism 100 via the rotator 202. The base 201 may be formed in a box shape, or may be configured only of frames.

The rotator 202 is provided between the base 201 and the moving mechanism 100 and rotatably connects the base 201 to the moving mechanism 100. A rotational center axis C of the rotator 202 substantially coincides with a direction in which a tip portion of the moving mechanism 100 and the base 201 are arranged. The rotator 202 can rotate the base 201 of the holder 200 with respect to the moving mechanism 100 in a direction in the figure and a direction opposite thereto. The rotator 202 may be provided not as a part of the holder 200 but as a part of the moving mechanism 100.

The suction device 203 is provided inside the base 201. The suction device 203 is, for example, a vacuum pump. The suction device 203 communicates with each of the plurality of suction units 205 via a hose or the like. By driving the suction device 203, the pressure in each suction unit 205 becomes lower than atmospheric pressure, and thus the object O is sucked and held by the suction units 205.

The plurality of switching valves 204 are provided one-to-one with respect to the plurality of suction units 205. Each of the switching valves 204 is switchable between a first state which allows communication between the corresponding suction unit 205 and the suction device 203 and a second state in which communication between the suction unit 205 and the suction device 203 is blocked and the suction unit 205 communicates with an outside (an atmospheric pressure space) of the handling device 10. When the object O is relatively small, the handling device 10 causes only one or a small number of the suction units 205 selected from the plurality of suction units 205 to function as the suction units 205 used for holding (hereinafter referred to as "effective suction units 205E"). In some figures described below, the effective suction units 205E and the other suction units 205 are shown distinguished from each other by adding dot patterns to the effective suction units 205E among the plurality of suction units 205.

The suction units 205 are disposed at one end portion of the base 201. The suction units 205 have outer shapes smaller than the smallest object positioned at the movement source B1. When the object O is relatively small and light, the handling device 10 sucks and holds the object O using only one or more effective suction units 205E selected from the plurality of suction units 205.

There is an upper limit to a weight of the object O that can be sucked and held by each suction unit 205 alone. When the object O is relatively large and heavy, the handling device 10 may be configured to suck and hold the heavy object O using two or more effective suction units 205E in combination among the plurality of suction units 205.

In the following description, a case in which the number of the suction units 205 is five will be described, but the number of the suction units 205 may be one.

Next, an overview of a holding plan that can change a degree of representation of a robot posture will be described.

In the present embodiment, a success rate at the time of holding planning is improved by using a manipulability map (a function map) in which ranges of possible postures and accessible regions can be selected in accordance with an environment that becomes a target. The manipulability map is, for example, a map indicating a manipulability of each position in the movement source B1. The manipulability is an index indicating how much a robot having only rotary joints can move in a certain posture, and is a parameter calculated from joint angles (Reference Document: Tsuneo YOSHIKAWA, "Manipulability of Robot Arms," Journal of the Robotics Society of Japan, Vol 2, No. 1, p 63-67, 1984).

Figure 3:
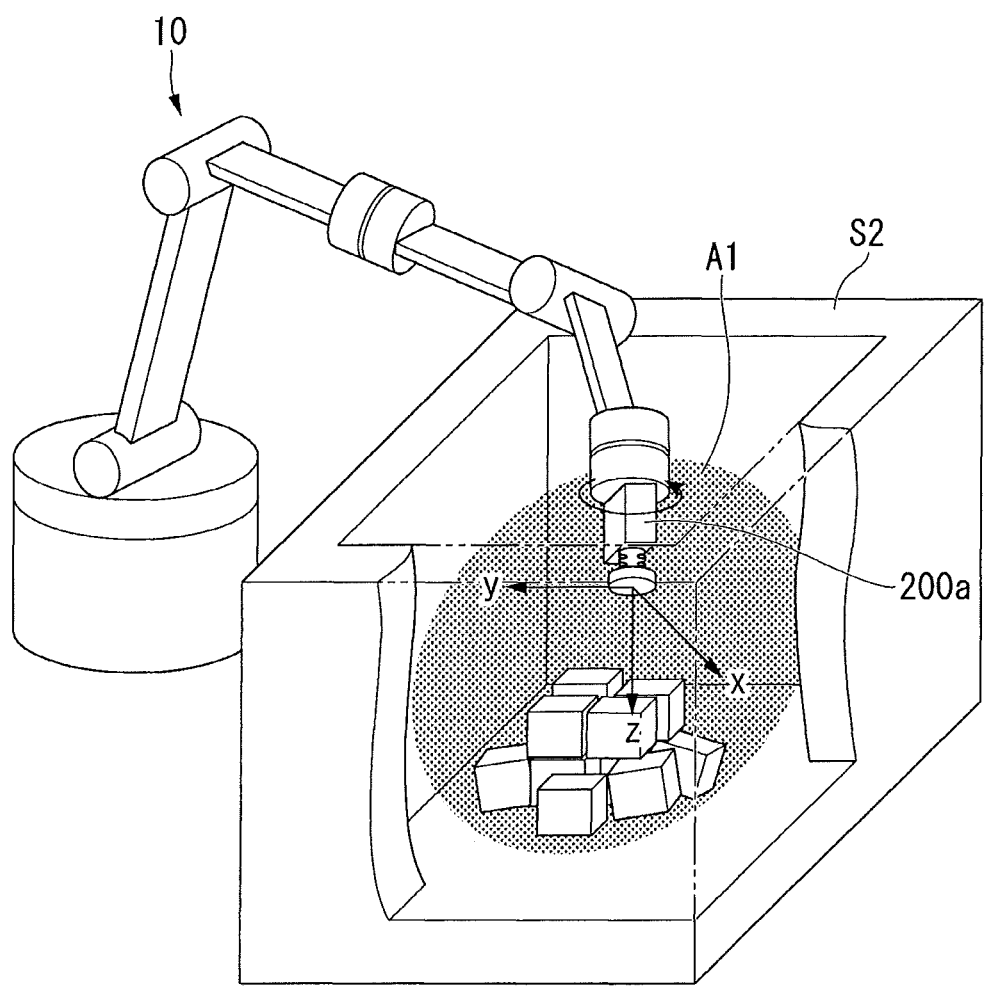
FIG. 3 is a diagram showing an example in which a limited region can be accessed.
Figure 4:
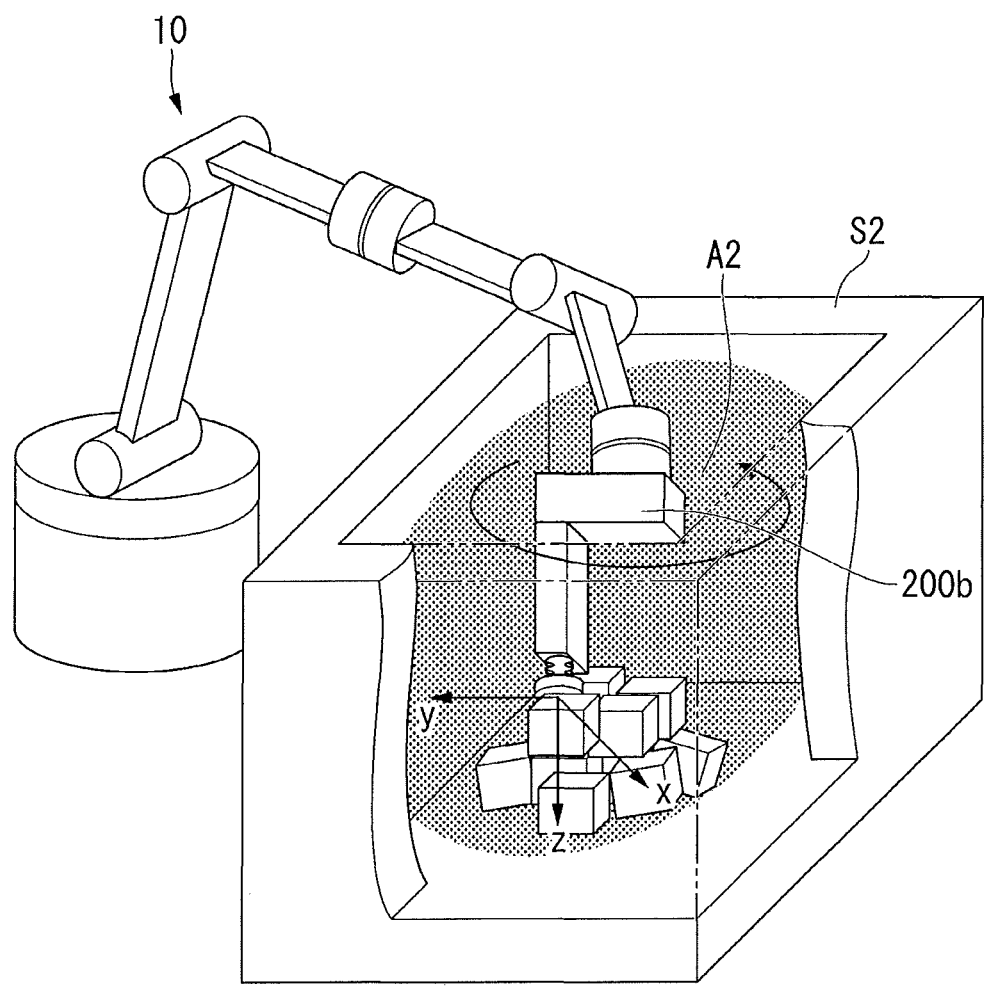
FIG. 4 is a diagram showing an example in which possible postures are limited, but with a general accessible region.

Thus, in the present embodiment, as shown in FIGS. 3 and 4, the accessible regions are changed by using the manipulability map. In FIGS. 3 and 4, reference signs A1 and A2 indicate regions which are accessible to the handling device 10.

FIG. 3 is a diagram showing an example in which a limited region can be accessed. In the example shown in FIG. 3, a first holder 200a is attached to the moving mechanism 100. The first holder 200a enlarges an accessible range in the z-axis direction.

FIG. 4 is a diagram showing an example in which possible postures are limited, but with a general accessible region. In the example shown in FIG. 4, a second holder 200b is attached to the moving mechanism 100. The second holder 200b enlarges an accessible range in the z-axis direction and an xy direction.

As described above, in the present embodiment, the holding plan in which the accessible region in a specific environment is changed is executed by adding the holder 200 which is an offset hand to the moving mechanism 100 which is a reference 6-DOF robot.

Next, an example of an arrangement layout of the plurality of suction units 205 will be described.

Figure 5:
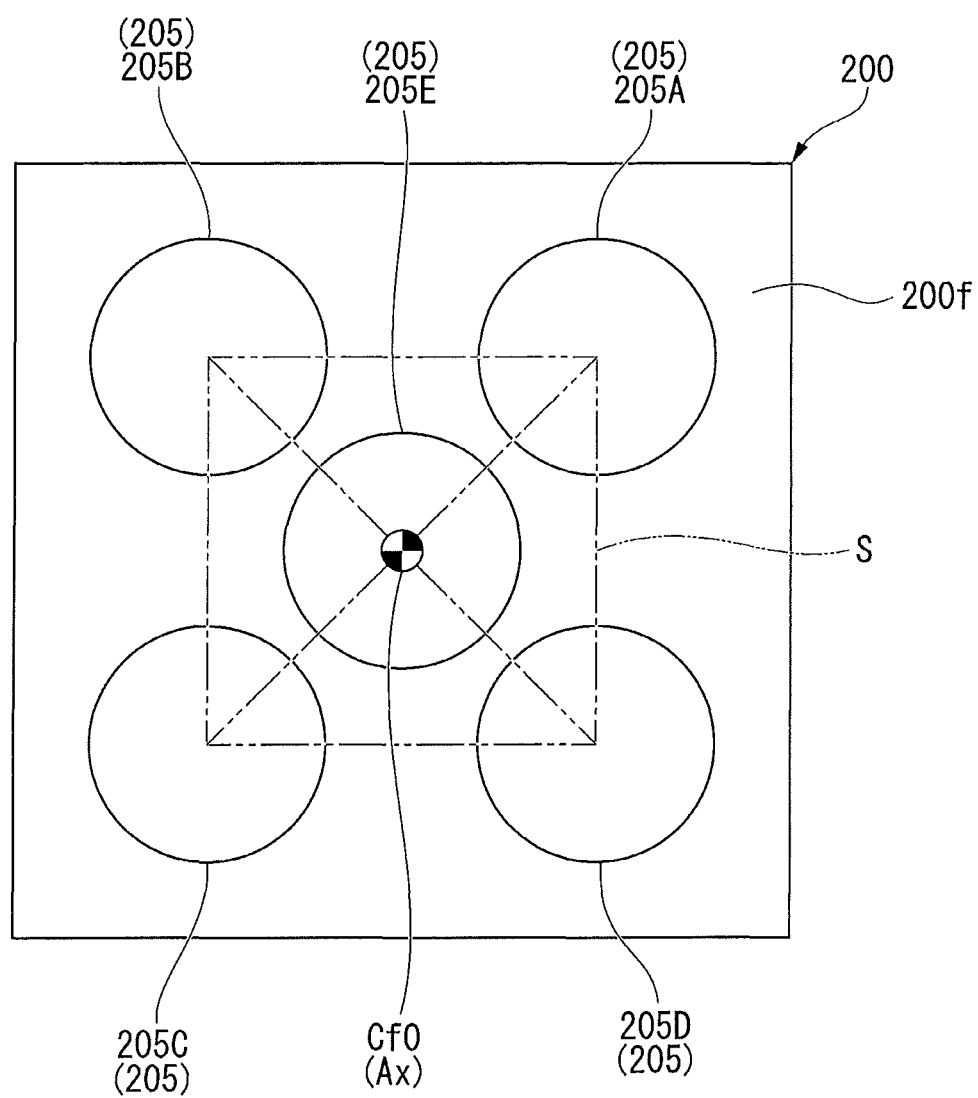
FIG. 5 is a bottom view showing an arrangement layout of a plurality of suction units according to the embodiment.

FIG. 5 is a bottom view showing the arrangement layout of the plurality of suction units of the present embodiment. As shown in FIG. 5, the number of the suction units 205 in the embodiment is five. Four suction units 205A to 205D are disposed to be positioned at corner portions of a virtual square S indicated by broken lines in FIG. 5. One suction unit 205E is disposed to be positioned at a center of the virtual square S (an intersection of two diagonal lines). Therefore, the plurality of suction units 205 are disposed rotationally symmetrical (fourfold symmetrical) about their centroid Cf0 (a center of gravity in FIG. 5).

The controller 300 can obtain the same arrangement of the plurality of suction units 205 at a plurality of (four) rotational angles around an axis Ax by rotating the holder 200 around the axis Ax that passes through the centroid Cf0 and is orthogonal to a virtual plane (or an end surface 200f) along which tips of the suction units 205 are substantially formed. The axis Ax is not limited to a rotation axis of the rotator 202 (joint) of the holder 200.

In the present embodiment, a holding form in which the object O is held by the holder 200 is referred to as a model. Examples of the model will be described below.

Figure 6:
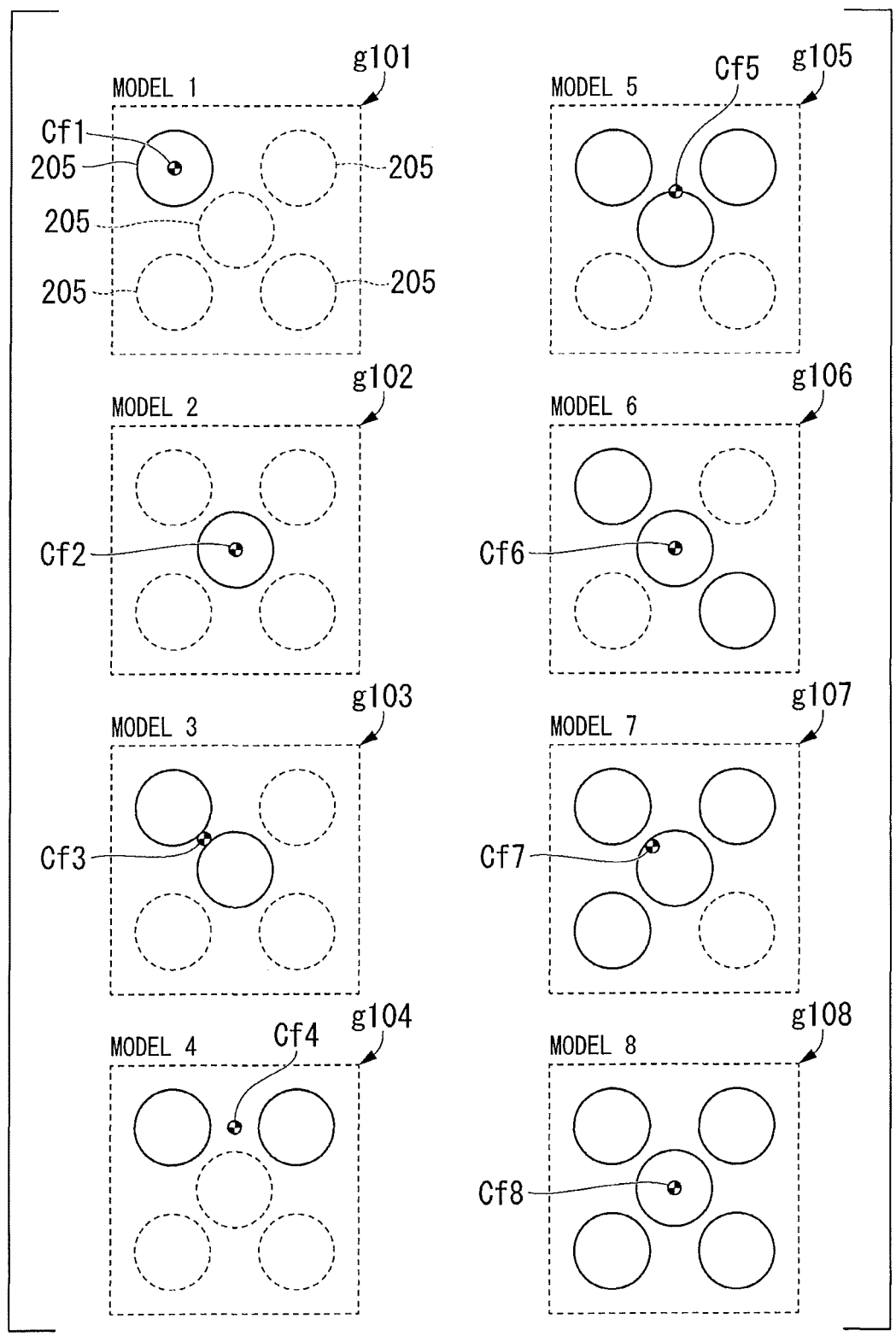
FIG. 6 is a diagram showing a plurality of models.

FIG. 6 is a diagram showing a plurality of models. The model is a classification of the holding forms achieved by the suction units 205, which are determined by the number and arrangement of the suction units 205. Cf1 to Cf8 shown in the models 1 to 8 in FIG. 6 are the centroids (centers of gravity) of the suction units 205.

In the models, the suction units 205 to be used are not completely specified. In each of the models in FIG. 6, solid line circles indicate suction units 205 in operation, and broken line circles indicate suction units 205 that are not in operation. In the present embodiment, as indicated by reference signs g101 and g102, the model 1 and the model 2 are set as holding forms using one suction unit 205. As indicated by reference signs g103 and g104, the model 3 and the model 4 are set as holding forms using two suction units 205. As indicated by reference signs g105 and g106, the model 5 and the model 6 are set as holding forms using three suction units 205. As indicated by a reference sign g107, the model 7 is set as a holding form using four suction units 205. As indicated by a reference sign g108, the model 8 is set as a holding form using five suction units 205.

There are four combinations of the suction units 205 as the model 1 in consideration of the rotational symmetry of the layout of the plurality of suction units 205. That is, there are a case in which the suction unit 205A (see FIG. 5) operates and the other suction units 205B to 205E (see FIG. 5) do not operate, a case in which the suction unit 205B operates and the other suction units 205A and 205C to 205E do not operate, a case in which the suction unit 205C operates and the other suction units 205A, 205B, 205D, and 205E do not operate, and a case in which the suction unit 205D operates and the other suction units 205A to 205C and 205E do not operate. Combinations belonging to each model indicate using forms (candidates) of the suction units 205 that satisfy the holding forms, and the using forms (candidates) are referred to as patterns. The model 1 includes four patterns as described above. In the patterns, the suction units 205 to be used are specified.

Similarly, in consideration of the rotational symmetry, there are four combinations of the suction units 205 as the model 2, the model 5, the model 6, the model 7, and the model 8, respectively. In other words, the model 2, the model 5, the model 6, the model 7, and the model 8 each include four patterns. The model 2 includes four patterns in which positions of non-operating suction units 205A to 205D vary.

In the model 3 and the model 4, there are four combinations of the suction units 205 in consideration of the rotational symmetry, but the number of combinations is further doubled in consideration of exchange (reversal) of positions of two suction units 205. Therefore, there are eight combinations of the suction units 205 that become the model 3 and the model 4, respectively. In other words, the model 3 and the model 4 each include eight patterns.

As described above, the models do not include a holding form in which operating suction units 205 are disposed on both sides of a non-operating central suction unit 205E, that is, a holding form in which the central suction unit 205E is not operating in the models 6, 7, and 8). This is because, when the central suction unit 205E can be disposed on a surface of the object O, the object O can be held more reliably by operating the suction unit 205E.

Figure 7:
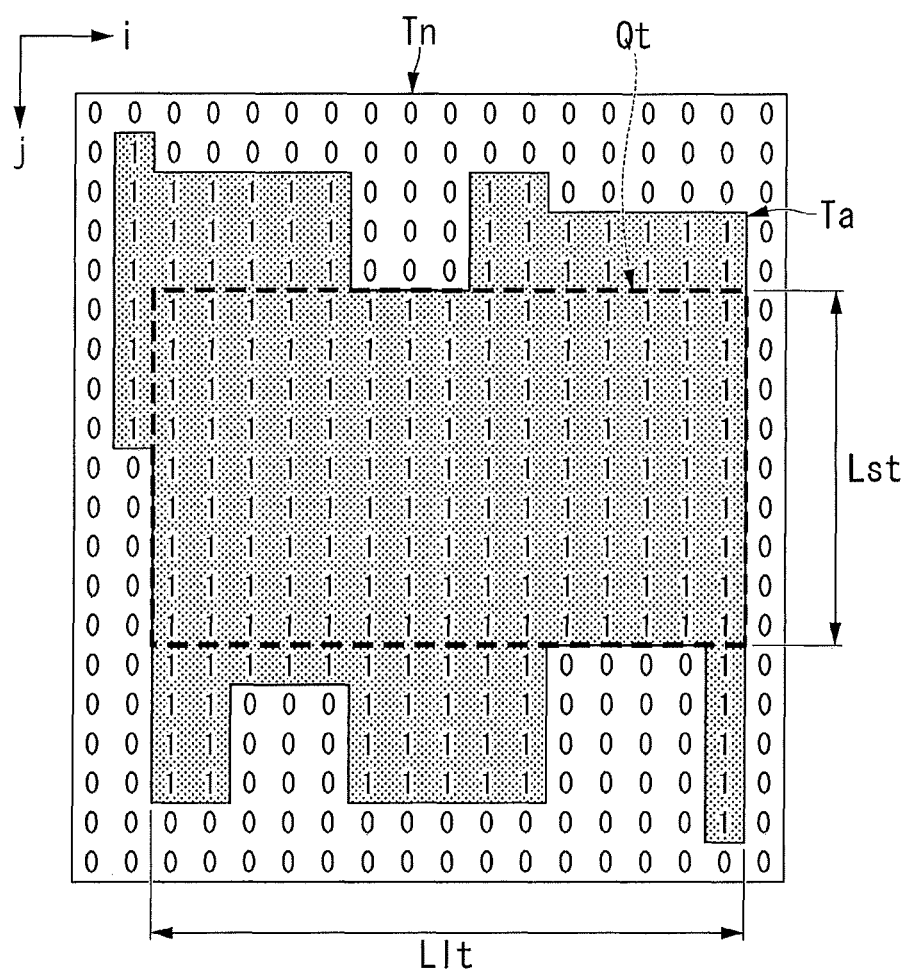
FIG. 7 is a diagram showing a holdable target region Ta that is detected on a surface (a suction surface or a target surface) of an object O.
Figure 8:
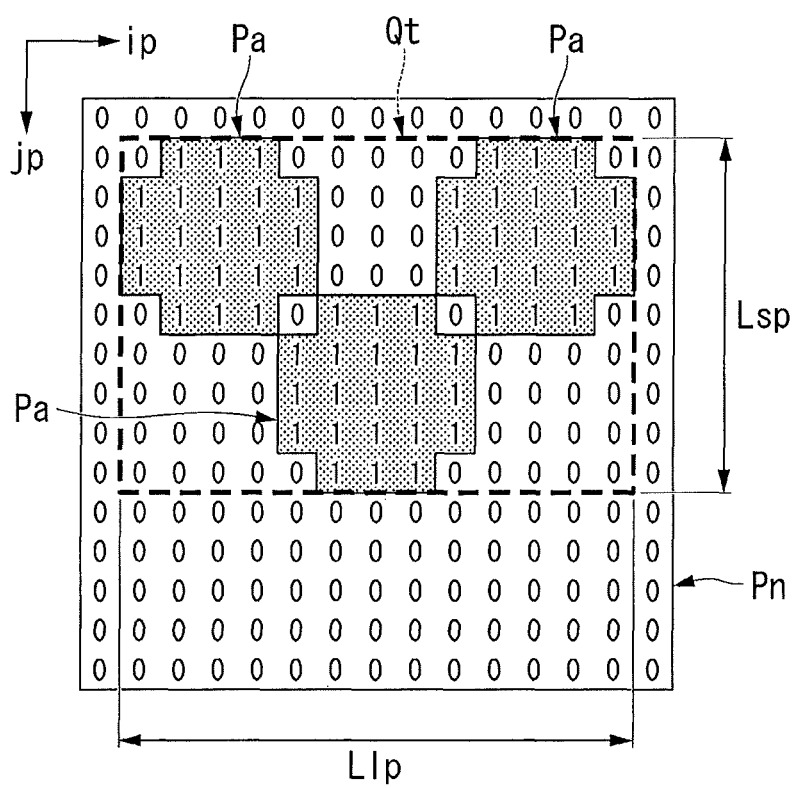
FIG. 8 is a diagram showing a pad region Pa in which a suction unit faces the target region Ta in a model 5 including three suction units.

FIG. 7 is a diagram showing a holdable target region Ta that is detected on a surface (a suction surface or a target surface) of the object O. FIG. 8 is a diagram showing a pad region Pa at which the suction units 205 face the target region Ta in the model 5 including three suction units 205. The target region Ta is also called a holdable region. The target region Ta is, for example, a region of the surface of the object O whose flatness is within a first threshold and whose area is equal to or larger than a second threshold. FIG. 7 shows binarized data, and in FIG. 7, a place in which a numerical value is "1" is the target region Ta, and a place in which a numerical value is "0" is a non-target region Tn (a non-holdable region). FIG. 8 also shows binarized data, and in FIG. 8, a place in which a numerical value is "1" is the pad region Pa, and a place in which a numerical value is "0" is a non-pad region Pn.

Next, an example of a calculation result of a degree of superimposition with the pad region Pa of the model will be described.

Figure 9:
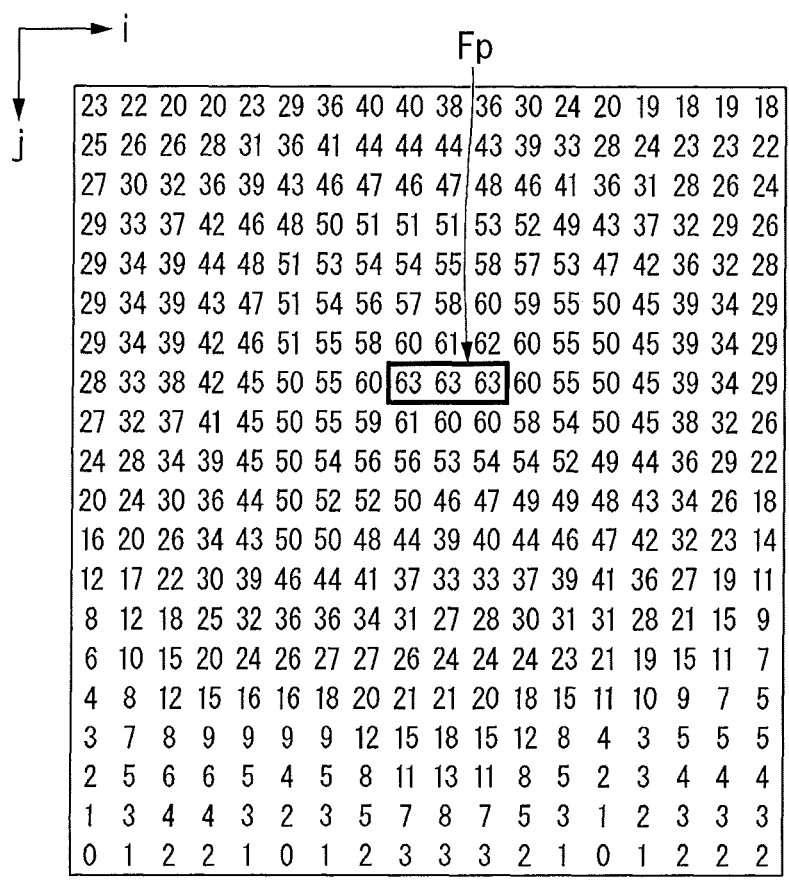
FIG. 9 is a diagram showing a calculation result of a degree of superposition between the target region Ta in FIG. 8 and the pad region Pa of the model 5 in FIG. 8.

FIG. 9 is a diagram showing the calculation result of the degree of superposition between the target region Ta in FIG. 8 and the pad region Pa of the model 5 in FIG. 8. A numerical value shown for each pixel in FIG. 8 indicates the degree of superposition when the centroid Cfp of the pad region Pa (the center of gravity in FIG. 8) is positioned at the position of the pixel. The degree of superimposition is a total value (a sum value), which is obtained by respectively multiplying values (1 or 0) of pixels in the data of FIG. 7 including the target region Ta by values (1 or 0) of pixels in the data of FIG. 8 including the pad region Pa and summing the results up for all pixels for the pixels that overlap each other. As shown by a thick frame Fp in FIG. 9, a holding position is set at a position in which the degree of superimposition is highest in the target region Ta, and in FIG. 9, it is set at a position in which the centroid of the pad region Pa is inside the thick frame Fp. The controller 300 changes the rotation angle and performs the same calculation as above at each angular position for the data including the pad region Pa, thereby determining the rotation angle (posture) having the highest degree of superposition as a holding posture.

Next, a configurational example of the manipulability map will be described.

FIG. 10 is a diagram showing a configurational example of the manipulability map according to the present embodiment. As shown in FIG. 10, the manipulability map associates a hand position and posture, an arm movable range, and a joint angle for each position No (number) of the movement source B1. The hand position and posture is represented by (x, y, z, α, β, γ), for example, when the joint angle is represented by the Euler angle. The arm movable range is represented by K (mm). The joint angle is represented by θ (deg).

Figure 11:
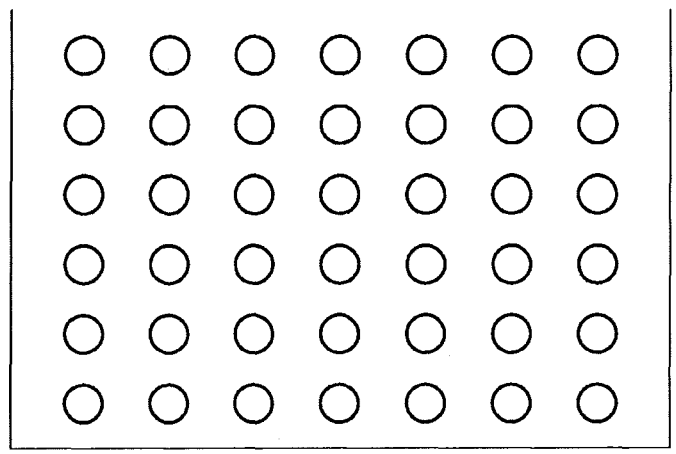
FIG. 11 is a diagram showing an example of an equal interval map in which a plurality of points are arranged at equal intervals.
Figure 12:
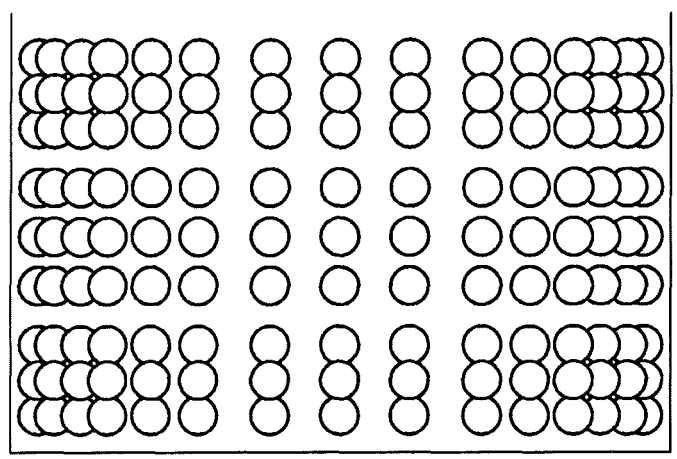
FIG. 12 is a diagram showing an example of an unequal interval map in which a plurality of points are arranged at unequal intervals.

FIG. 11 is a diagram showing an example of an equal interval map in which a plurality of points are arranged at equal intervals. This equal interval map is an example of the manipulability map. FIG. 12 is a diagram showing an example of an unequal interval map in which a plurality of points are arranged at unequal intervals. This unequal interval map is an example of the manipulability map. In FIGS. 11 and 12, the point represents an index of a position in the movement source B1.

As shown in FIG. 11, in the equal interval map, indices of the positions in the movement source B1 are set at equal intervals. In FIG. 11, the inside of the movement source B1 is represented in two dimensions (in an yz plane), but the indices of the positions in the movement source B1 are also set at equal intervals in the depth direction (x-axis direction). As shown in FIG. 12, in the unequal interval map, the indices of the positions in the movement source B1 are sparse at the center of the movement source B1 and are densely set at ends of the movement source B1. In FIG. 12, the inside of the movement source B1 is represented in two dimensions (in the yz plane), but the indices of the positions in the movement source B1 are sparse at the center of the movement source B1 and are densely set at the ends of the movement source B1 also in the depth direction (x-axis direction).

As described above, in the present embodiment, a map in which the manipulability is associated with each position in the movement source B1 by the moving mechanism 100 and the holder 200 for the inside of the movement source B1 is generated as the manipulability map. As shown in FIGS. 11 and 12, the manipulability map is not limited to ones in which the indices of the positions in the movement source B1 are at equal intervals or unequal intervals, and may be configured to be generated and stored separately as a manipulability map of positions of the hand and a manipulability map of postures of the hand, which will be described later. The manipulability map may be a map in which the postures are limited or the positions are limited.

Next, the manipulability will be described.

The manipulability ω of a robot is defined as in the following equation (1).

[Equation 1]

$$\omega = \sqrt{\det(J(\theta) \cdot J(\theta)^T)} \quad (1)$$

In Equation (1), det is a symbol representing a determinant. The symbol T represents a transposed matrix. $J(\theta)=df(\theta)/d\theta \in R^{m \times n}$ (a set of m×n real matrixes), and $J(\theta)$ is a Jacobian matrix. $\theta$ is a joint angle vector. $f(\theta)=r$, and r is a state vector of a hand effector (holder 200) and is composed of variables representing positions of a hand in a reference coordinate system of a robot system and postures based on the Euler angle and the like. The Jacobian matrix $J(\theta)$ is obtained in advance for each robot. The manipulability is determined in advance for each position in the movement source B1, thereby generating the manipulability map.

The meaning that the manipulability $\omega$ is 0 means that there is no solution and the robot cannot take a posture. A larger manipulability $\omega$ means a posture that the robot can take more easily.

Assuming that a minute step on a trajectory from a current position X of the hand to a target position Xr is $\Delta X$, a minute change $\Delta\theta$ of a joint angle in a 6-DOF robot is represented by the following equation (2).

[Equation 2]

$$\Delta X = J(\theta)\Delta\theta \quad (2)$$

The inverse matrix of Equation (2) is represented as the following equation (3).

[Equation 3]

$$\Delta\theta = J^{-1}(\theta)\Delta X \quad (2)$$

In Equation (3), the right side is an input and the left side is an output. $J(\theta)$ is a matrix of 6 rows and 1 column. Using Equation (3), when the hand reaches a certain position and posture, a joint angle of each joint of the robot can be obtained.

The fact that the manipulability has been calculated means that the inverse kinematics at that position and posture can be solved. In the present embodiment, when the object O is sucked by the holder 200 from the movement source B1 and moved to the movement destination container B2, an internal state of the movement source B1 is captured as described later. In the present embodiment, on the basis of the results of analyzing the captured image and the manipulability map, a holding plan for determining what position and posture the object O is to be sucked is generated.

In the present embodiment, interference checks between the movement source B1, the moving mechanism 100, and the holder 200 are performed at the same time.

Next, an example of the manipulability map will be described.

Figure 13:
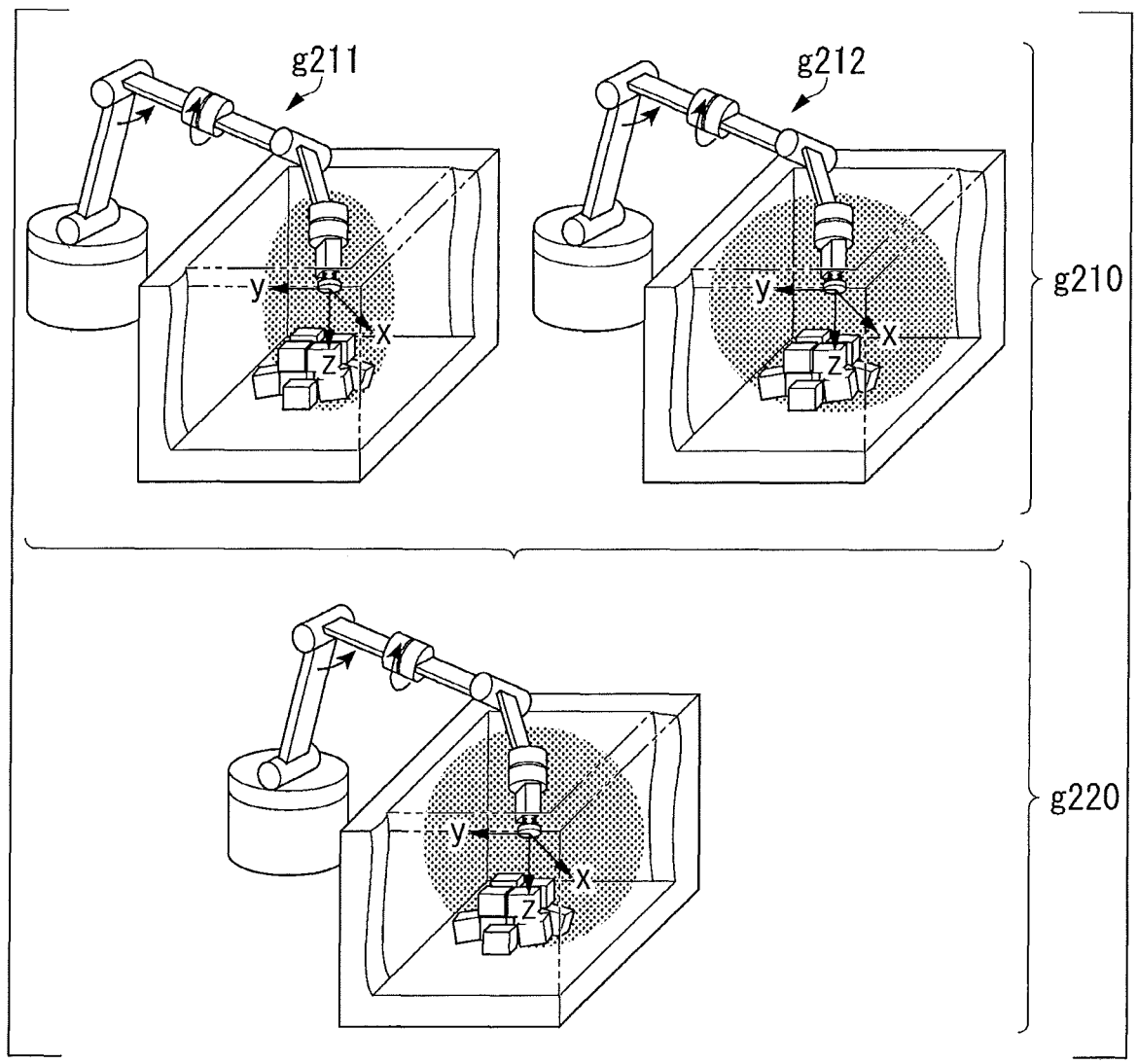
FIG. 13 is a diagram showing an example in which the manipulability map according to the embodiment is divided or integrated.

FIG. 13 is a diagram showing an example in which the manipulability map according to the present embodiment is divided or integrated.

In the present embodiment, as in the region indicated by a reference sign g210 in FIG. 13, the controller 300 stores manipulability maps calculated for the respective hand positions and postures as separate maps in a storage 340. The manipulability maps are stored as a database and are used at the time of holding planning. Thus, the controller 300 can select whether to use a manipulability map specialized for an accessible range or to use a manipulability map corresponding to various postures. The region indicated by a reference sign g211 represents a manipulability map ($w_{transration}$) related to positions of the hand. The region indicated by a reference sign g212 represents a manipulability map ($w_{rotation}$) related to postures of the hand. As in the region indicated by a reference numeral g220 in FIG. 13, the controller 300 can also store a manipulability map obtained by integrating the manipulability map of the positions of the hand and the manipulability map of the postures of the hand ($w=w_{transration} * w_{rotation}$).

The controller 300 generates and stores the manipulability map in accordance with various situations such as when an accessible region is required to be maximized, possible postures are required to be maximized, ease of release is required to be maximized, or the like. For example, when it is required to search for the accessible region in detail, the controller 300 performs changes such as enlarging a size of the manipulability map, making intervals between the positions in the movement source B1 in the manipulability map equal or unequal, and the like, and uses the manipulability map adapted to a usage situation at the time of holding planning.

Next, a surface shape primitive will be described.

Figure 14:
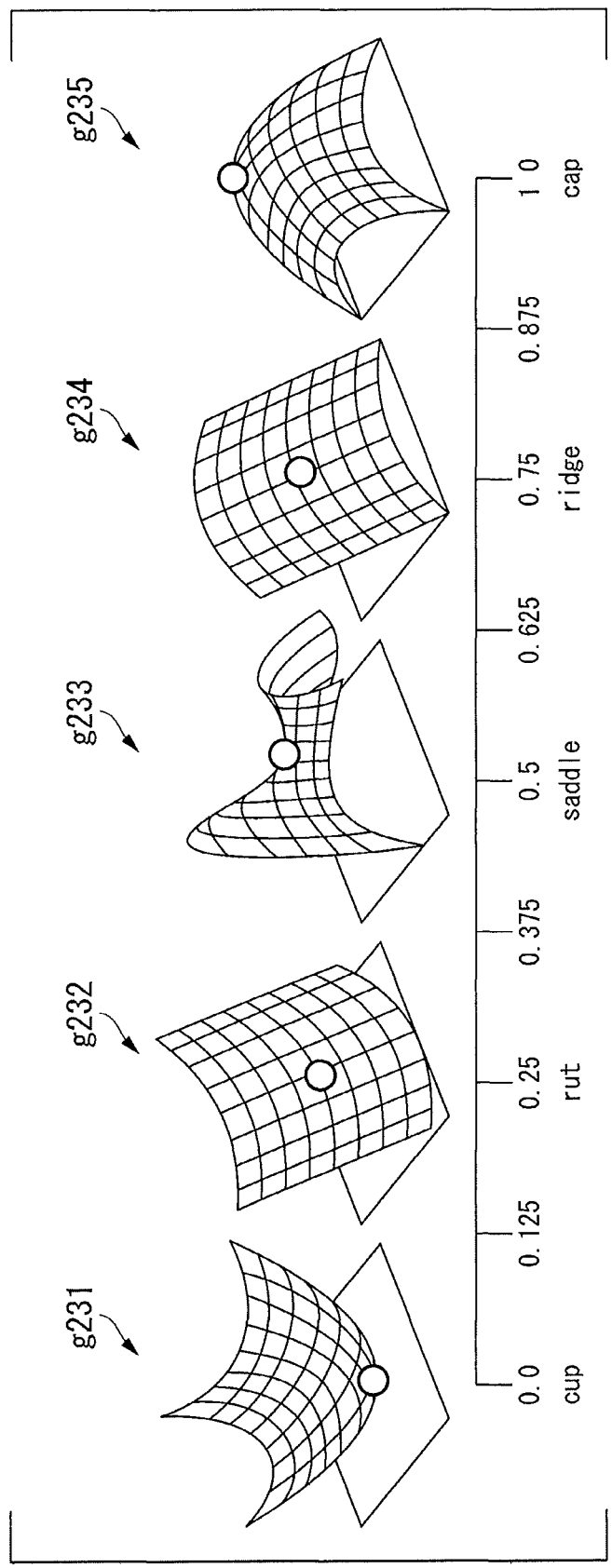

As also shown in FIG. 14, when searching for postures, the controller 300 introduces a surface shape primitive which represents characteristic curvature shapes of surface shapes and searches for manipulabilities of characteristic postures, thereby reducing the number of represented postures. FIG. 14 is a diagram for explaining an example in which the surface shape primitive is defined and only a posture of a characteristic surface shape is searched for. In FIG. 14, the horizontal axis represents an example of types of basic shapes (primitive) of the surface shape. The surface shape primitive includes, for example, a sunken bottom (cup, symbol g231), a depression (rut, symbol g232), a saddle portion (saddle, symbol g233), a swollen back (ridge, symbol g234), and a bulging top (cap, symbol g235). The types and numbers of the surface shape primitive shown in FIG. 14 are merely examples, and the present invention is not limited thereto.

Thus, according to the present embodiment, by limiting the postures in accordance with the shapes of the object O, the number of searches in the manipulability map is reduced, and thus the search at the time of picking can be speeded up.

Next, an example of a score calculation method will be described.

The controller 300 calculates, for each pattern (candidate), a score as an index for selecting the pattern (index for determining). The controller 300 sets a variable (a numerical value or a physical quantity) of each term of the score to x, (i=1, 2, . . . , n) and a coefficient (a weighting coefficient) of each term to a (i=1, 2, . . . , n), and calculates the score x using the following equation (4).

[Equation 4]

$$x = a_1 \cdot x_1 + a_2 \cdot x_2 + \ldots + a_n \cdot x_n \quad (4)$$

The variables include, for example, for each pattern, the number of the holders 200, a distance between a centroid (center of gravity) of the holders 200 and a centroid (center of gravity) of the object O, an amount of movement (a moving length, a moving angle, an energy consumption) from a current position and a current posture to a holding position and a holding posture, a time required therefor from the current position and the current posture to the holding position and the holding posture, a distance from the holders 200 to an obstacle in the holding position and the holding posture, an angle with respect to a horizontal plane of the target region Ta, a height of the target region Ta, and the like. Each coefficient is set such that the score increases as the number of the holders 200 increases. Each coefficient is set such that the score increases as the distance between the centroid (center of gravity) of the holders 200 and the centroid (center of gravity) of the object O becomes shorter. Each coefficient is set such that the score decreases as the distance from the holders 200 to the obstacle becomes shorter. Each coefficient is set such that the score increases as the angle between the handling device 10 and the horizontal plane of the target region Ta becomes smaller. Each coefficient is set such that the score increases as the height of the target area Ta becomes higher. The variables (numerical values or physical quantities) are physical quantities based on at least one of information about the objects O, information on the handling device 10, and information on obstacles. The variables (numerical values or physical quantities) may be physical quantities related to whether or not holding and transferring is possible, and an efficiency, quickness, energy consumption, sureness, robustness, reliability, and the like of holding and transferring, and are not limited to the above examples. Equation (4) may include at least one term, and the types and number of variables, a magnitude of the coefficient for each index, and the like can be appropriately adjusted in accordance with a usage environment, and the like.

Next, a configurational example of the controller 300 will be described.

Figure 15:
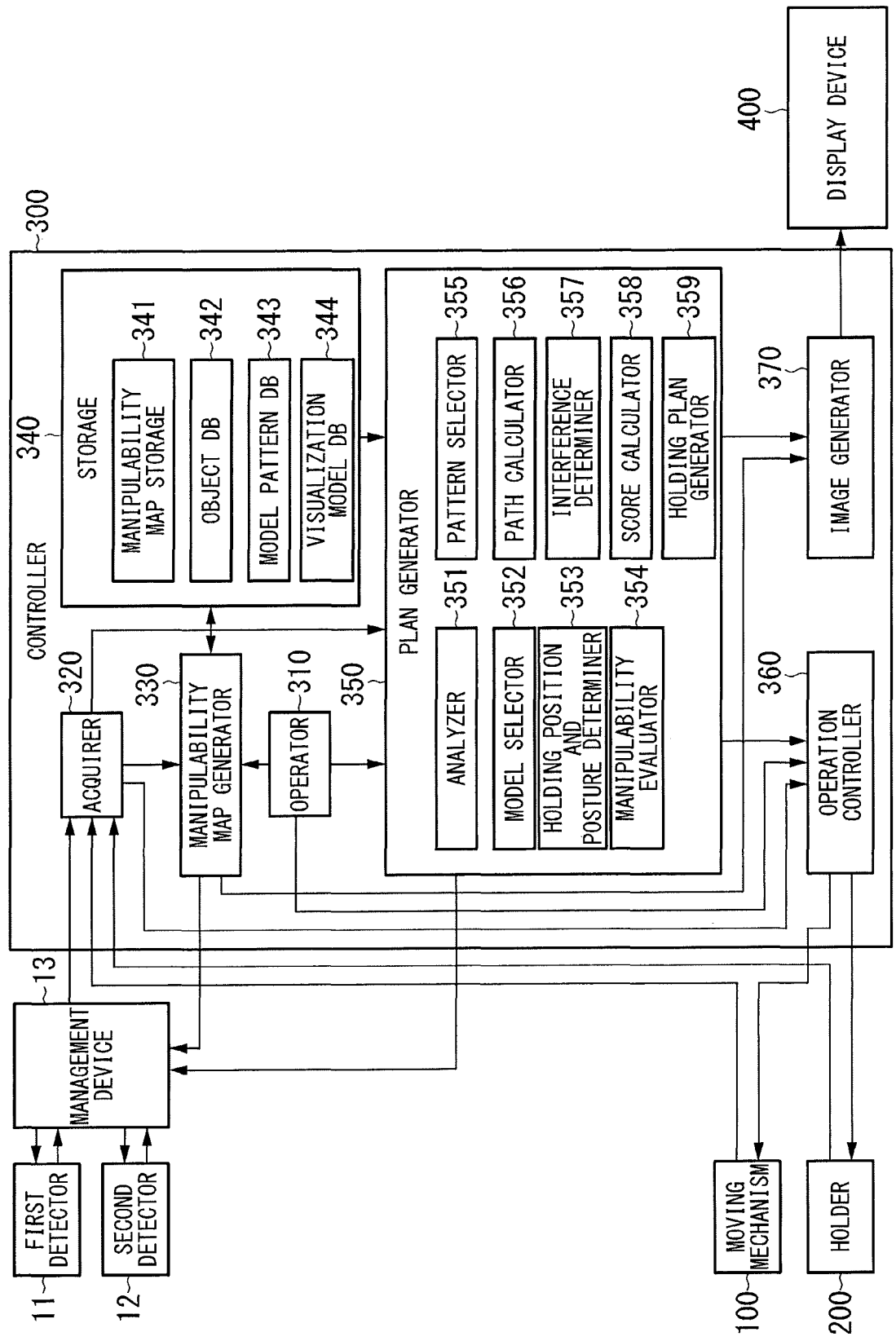
FIG. 15 is a block diagram showing a systemic configuration of the transfer system including a controller according to the embodiment.

FIG. 15 is a block diagram showing a system configuration of the transfer system 1 including the controller 300 according to the present embodiment. As shown in FIG. 15, the management device 13, the moving mechanism 100, the holder 200, and a display device 400 are connected to the controller 300. The holder 200 may be connected via the moving mechanism 100.

The controller 300 includes an operator 310, an acquirer 320, a manipulability map generator 330, the storage 340, a plan generator 350, an operation controller 360, and an image generator 370. The storage 340 includes a manipulability map storage 341, an object DB 342, a model pattern DB 343, and a visualization model DB 344. The plan generator 350 includes an analyzer 351, a model selector 352, a holding position determiner 353, a manipulability evaluator 354, a pattern selector 355, a path calculator 356, an interference determiner 357, a score calculator 358, and a holding plan generator 359.

The display device 400 is, for example, a liquid crystal display device, an organic electro luminescence (EL) display device, a portable terminal, or the like. The display device 400 displays an image output by the controller 300.

The operator 310 is, for example, at least one of a mouse, a keyboard, a mechanical switch, and a touch panel sensor provided on the display device 400. The operator 310 detects an operation result operated by a user and outputs the detected result to the manipulability map generator 330, the plan generator 350, and the operation controller 360.

The acquirer 320 acquires an image output by the management device 13 or a detection value detected by a sensor. The acquirer 320 acquires a detection value detected by a sensor included in each of the moving mechanism 100 and the holder 200. The acquirer 320 outputs the acquired image and the detected value to the manipulability map generator 330, the plan generator 350, and the operation controller 360.

The manipulability map generator 330 generates the manipulability map on the basis of the image and detection result output by the acquirer 320 and information stored in the visualization model DB 344 of the storage 340 in accordance with the operation result output by the operator 310. The manipulability map generator 330 causes the manipulability map storage 341 to store the generated manipulability map. The manipulability map and a method for generating the manipulability map will be described later.

The storage 340 temporarily stores various set values, images, detected values, and the like. The storage 340 stores threshold values for the degrees of superimposition.

The manipulability map storage 341 stores, for example, at least one manipulability map among a manipulability map in which postures and positions are integrated, a posture manipulability map, a position manipulability map, a manipulability map in the case of a measure for maximizing the accessible region, a manipulability map in the case of a measure for maximizing the possible postures of the moving mechanism 100 and the holder 200, and the manipulability maps in the case of measures for maximizing ease of release when releasing the object O to the movement destination container B2. Each manipulability map will be described later.

The object DB 342 is a database. In the object DB 342, for example, a type or identification information of the object O positioned at the movement source B1 is registered in association with weight information of the object O.

The model pattern DB 343 is a database. In the model pattern DB 343, model patterns related to the suction units 205 are registered. Information about the moving mechanism 100 and the holder 200 (shapes and models, etc.), information about the movement source B1 (inner sizes, models, etc.), information about the movement destination container B2 (inner sizes, models, etc.) are registered in the model pattern DB 343. The model pattern DB 343 stores, for each model, information indicating a long side Llp and a short side Lsp of a circumscribed quadrangle Qp that can accommodate the model as shown in FIG. 7.

The visualization model DB is a database. The visualization model DB stores an image of a robot model, an image of a robot hand, an image of the movement source B1, an image of an initial value of the manipulability map, and the like, which are displayed on the display device 400 when visualization is performed.

At the time of generating the manipulability map, the plan generator 350 causes the first detector 11 to capture an image including the movement source B1 via the management device 13, for example. When the object O is transferred from the movement source B1 to the movement destination container B2, the plan generator 350 causes the first detector 11 to capture an image including the movement source B1 via the management device 13 and generates a holding plan on the basis of a result of analyzing the captured image and the manipulability map.

The analyzer 351 acquires a detection result output by the acquirer 320 and analyzes information about a holding target object O on the basis of the acquired detection result. When the detection result is an image, the analyzer 351 performs image processing (for example, binarization, edge detection, feature material detection, clustering processing, and the like) on the acquired image. The analyzer 351 uses, for example, information about surfaces and information about depths from the captured image. The analyzer 351 selects an image of the holding target object O using information stored in the object DB 342 of the storage 340 on the basis of the result of the image processing. Subsequently, the analyzer 351 analyzes states of curved surfaces of the selected holding target object O.

The model selector 352 selects a model on the basis of a shape and a size of the target region Ta of the object O. Specifically, the model selector 352 acquires information indicating a size of a largest quadrangle Qt (an inscribed quadrangle) included in the target region Ta, for example, a long side Llt (length) and a short side Lst (length) as shown in FIG. 7, from information indicating the target region Ta obtained on the basis of the detection value detected by the first detector 11. The long side Llt and the short side Lst are examples of information indicating the target region Ta. The model selector 352 selects at least one model that can be disposed in the quadrangle Qt on the basis of the long side Llt and the short side Lst. The model selector 352 selects a model, which has the long side Llt of the quadrangle Qt that is equal to or longer than the long side Llp of the circumscribed quadrangle Qp (Llt≥Llp) and the short side Lst of the quadrangle Qt that is equal to or longer than the short side Lsp of the circumscribed quadrangle Qp (Lst≥Lsp), from a plurality of models as a candidate of a holding form for the target region Ta.

The holding position determiner 353 calculates the degree of superposition of the target region Ta and the pad region Pa of the model. The holding position determiner 353 determines suction positions (holding positions) of the holders 200 in the model selected as the candidate of the holding form on the basis of the calculated degree of superimposition. The holding position determiner 353 determines, for example, positions in which the degree of superimposition is equal to or more than a predetermined value (threshold) as the holding position. For this reason, there may be a plurality of candidate holding positions. The holding position determiner 353 generates a plurality of holding positions (holding points) as a holding point list and causes the storage 340 to store the generated holding point list. The holding position determiner 353 changes the rotation angle and performs a calculation of the degree of superposition for each angular position for the data including the pad region Pa, thereby determining the rotation angle (posture) having the highest degree of superposition as the holding posture. When there are a plurality of candidate holding positions, the holding position determiner 353 determines the holding posture for each candidate holding position.

The manipulability evaluator 354 selects a manipulability map on the basis of, for example, operation results of the user operating the operator 310. Alternatively, the manipulability evaluator 354 selects the manipulability map on the basis of types, shapes and sizes of the holder 200, positions and postures of the handling device 10 before moving, or the like. The manipulability evaluator 354 compares the holding point list determined by the holding position determiner 353 with the manipulability map to evaluate the manipulability for each candidate holding point. The evaluation method of the manipulability will be described later.

When the model has a plurality of patterns, the pattern selector 355 selects one of the plurality of patterns. When the selected pattern is determined to interfere therewith as a result of determination of the interference determiner 357, the pattern selector 355 excludes the selected pattern. When the selected pattern is not determined to interfere therewith as a result of determination of the interference determiner 357, the pattern selector 355 determines to use the selected pattern.

The path calculator 356 calculates a moving path to the holding position and the holding posture from the current position and the current posture of the holder 200.

The interference determiner 357 determines whether or not there is interference between the holder 200 and the handling device 10 and obstacles with respect to the movement of the holder 200 on the path of movement calculated by the path calculator 356.

The score calculator 358 calculates a score as an index (index for determining) for selecting a pattern in the pattern selector 355 for each pattern (candidate) using the above-described equation (4).

The holding plan generator 359 generates a holding plan on the basis of the selected model and information stored in the storage 340. The holding plan generator 359 converts a data format of the generated holding plan into a data format that can be used for controlling the moving mechanism 100 and the holder 200 and outputs the converted holding plan data to the operation controller 360.

The operation controller 360 generates a driving instruction on the basis of information on the holding plan output from holding plan generator 359 and outputs the generated drive instruction to the moving mechanism 100 and the holder 200.

For example, when the manipulability map is generated, the image generator 370 generates an image of information indicating a work state, an image of the manipulability map, an image of movable regions, and the like on the basis of the operation result of the user operating the operator 310. The image generator 370 causes the display device 400 to display the image of the generated information indicating the work state, the image of the manipulability map, and the image of the movable regions.

Next, an example of a processing procedure for using the manipulability map in a holding plan will be described. FIG. 15 is a flowchart of a process of using the manipulability map in a holding plan according to the present embodiment. The example shown in FIG. 15 is an example of a holding plan when the object O accommodated in the movement source B1 is sucked by the holder 200 and moved to the movement destination container B2. In the following processing, the manipulability map, the model, and the like are stored in the storage 340 in advance. It is also assumed that the holding target object O is determined by, for example, operating the operator 310.

In the example described above, an example in which the position, posture, shape, holding surface, holding point, and the like of the holding target object O are detected on the basis of the captured image has been described, but the present invention is not limited thereto. When the first detector 11 is, for example, an object detector using a laser or the like, the analyzer 351 may be configured to detect the position, posture, shape, holding surface, holding point, and the like of the object O on the basis of the detection result detected by the first detector 11.

(Step S1) The controller 300 initializes set values.

(Step S2) The plan generator 350 causes the first detector 11 to capture an image including the movement source B1 via the management device 13, for example. Subsequently, the acquirer 320 acquires the detection result detected by the first detector 11 and the detection result detected by the second detector 12 from the management device 13. The detection result detected by the first detector 11 includes information (position, size, and the like) on the object O. The acquirer 320 acquires information (position and posture) on the handling device 10 from the moving mechanism 100 and the holder 200. When the detection result of the first detector 11 and the detection result of the second detector 12 include images, the analyzer 351 performs image processing to acquire information on the object O. The analyzer 351 analyzes a curvature shape of the object O on the basis of the information output by the acquirer 320.

(Step S3) The model selector 352 selects a model that is a holding form of the holder 200 on the basis of the information about the object O. The selected model may include a plurality of patterns as described above.

(Step S4) The holding position determiner 353 calculates the degree of superposition of the target region Ta and the pad region Pa of the model. Subsequently, the holding position determiner 353 determines the suction position (holding position) of the holder 200 in the absolute coordinate system and the holding posture thereof in the absolute coordinate system for the selected model on the basis of the calculated degree of superimposition. In the following description, the point representing the holding position and posture is referred to as the holding point. There may be a plurality of candidate holding positions. In such a case, the holding position determiner 353 associates, for each holding position, candidates of the holding positions with information indicating holding postures of the candidate holding positions to set holding points, and stores information on a plurality of holding points as the holding point list. The holding points are acquired online, for example, while the handling device 10 is operated.

(Step S5) The manipulability evaluator 354 selects the manipulability map to be used in accordance with purposes and the attached holder 200. Subsequently, the manipulability evaluator 354 evaluates the manipulability for each of the holding points using the selected manipulability map and gives a manipulability score related to the position and posture. The evaluation of the manipulability will be described later with reference to FIG. 17. The manipulability evaluator 354 excludes the holding points of the postures and positions that cannot be held on the basis of the evaluation result.

(Step S6) The pattern selector 355 selects one from a plurality of patterns included in the selected model.

(Step S7) The path calculator 356 calculates a moving path to the determined holding position and holding posture from the current position and current posture of the holder 200. Subsequently, regarding the movement of the holder 200 on the calculated movement path, the interference determiner 357 determines whether there is interference between the holder 200 and the handling device 10 and obstacles other than the holding target object O.

(Step S8) The interference determiner 357 determines whether or not there is interference between the holder 200 and the handling device 10 and obstacles other than the holding target object O on the basis of Step S7. When it is determined to be reachable without interference (Step S8; YES), the interference determiner 357 proceeds to the process of Step S9. When it is determined to be not reachable without interference, that is, it is determined that interference occurs (Step S8; NO), the interference determiner 357 proceeds to the process of Step S10.

(Step S9) The score calculator 358 calculates a score regarding the degree of manipulability for each of the candidate holding points for the selected pattern using Equation (4). In Equation (4), the a is a coefficient, and $x_i$ is a physical quantity. The $x_i$ is a shape of the pad, a distance from the center of gravity, and the like. Equation (4) is represented as $x=a_1x_1$ (pad shape)$+a_2x_2$ (distance from the center of gravity)$+a_3x_3$ (manipulability score)+ ..., and the manipulability score is added in parallel with the physical quantity $x_i$. The manipulability score is generated for each holding point, but in this case, since the equation of $x_i$ itself is also updated, it is formed such that x exists for each holding point. For example, f(1) is a position score of a first holding point, f(2) is a posture score at the first holding point, and f is a score for one holding point. In $x=a_1x_1$ (pad shape)$+a_2x_2$ (distance from the center of gravity)$+a_3x_3$ (ma-nipulability score)+ ..., $x_3$ is the manipulability score f. The manipulability score f is given for each holding point in step S116 of FIG. 17 described below. The score calculator 358 normalizes, for example, the manipulability scores regarding the positions and postures given in the manipulability evaluation and allows them to be calculated as a unified score. Subsequently, when a score function is defined as x, the score calculator 358 represents the manipulability score fj with a weight wj (j=1, 2, ..., n, numbers of the candidate holding points) as a non-linear function as in the following equation (5).

[Equation 5]

$$x = wj \times fj \qquad (5)$$

After the processing, the score calculator 358 proceeds to the process of step S11.

(Step S10) The pattern selector 355 excludes the selected pattern. After the processing, the pattern selector 355 proceeds to the process of Step S11.

(Step S11) The pattern selector 355 determines whether or not there is another pattern candidate. When it is determined that there is another pattern candidate (step S11; YES), the pattern selector 355 returns the process to Step S6. When it is determined that there is no other pattern candidate (step S11; NO), the pattern selector 355 proceeds to Step S12.

(Step S12) The pattern selector 355 selects a usage form (candidate) of the pattern having the highest score as a pattern used for control.

(Step S13) The holding plan generator 359 generates a holding plan on the basis of the selected model and the information stored in the storage 340. Subsequently, the holding plan generator 359 converts a data format of the generated holding plan into a data format that can be used for controlling the moving mechanism 100 and the holder 200. Subsequently, the operation controller 360 controls the moving mechanism 100 and the holder 200 to suck the object O at the movement source B1 on the basis of instructions of the holding plan output from the holding plan generator 359 and moves the sucked object O to the movement destination container B2. The operation controller 360 confirms that the target has been achieved on the basis of the result obtained by the acquirer 320 and the like and sets a goal achievement end state.

Figure 16:
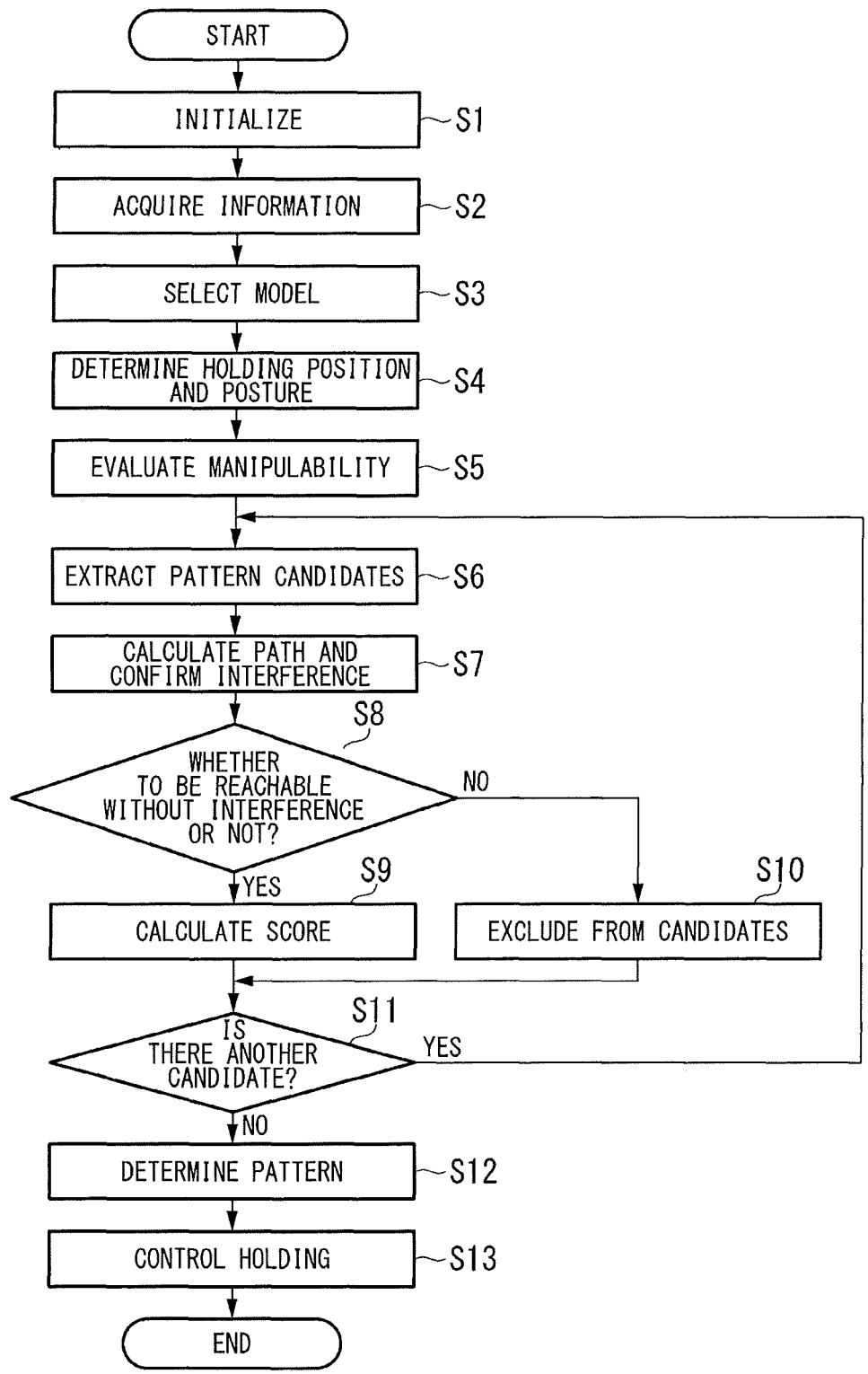
FIG. 16 is a flowchart of a process of using the manipulability map in a holding plan according to the embodiment.

Next, a processing performed in the manipulability evaluation performed in Step S5 of FIG. 16 will be described.

Figure 17:
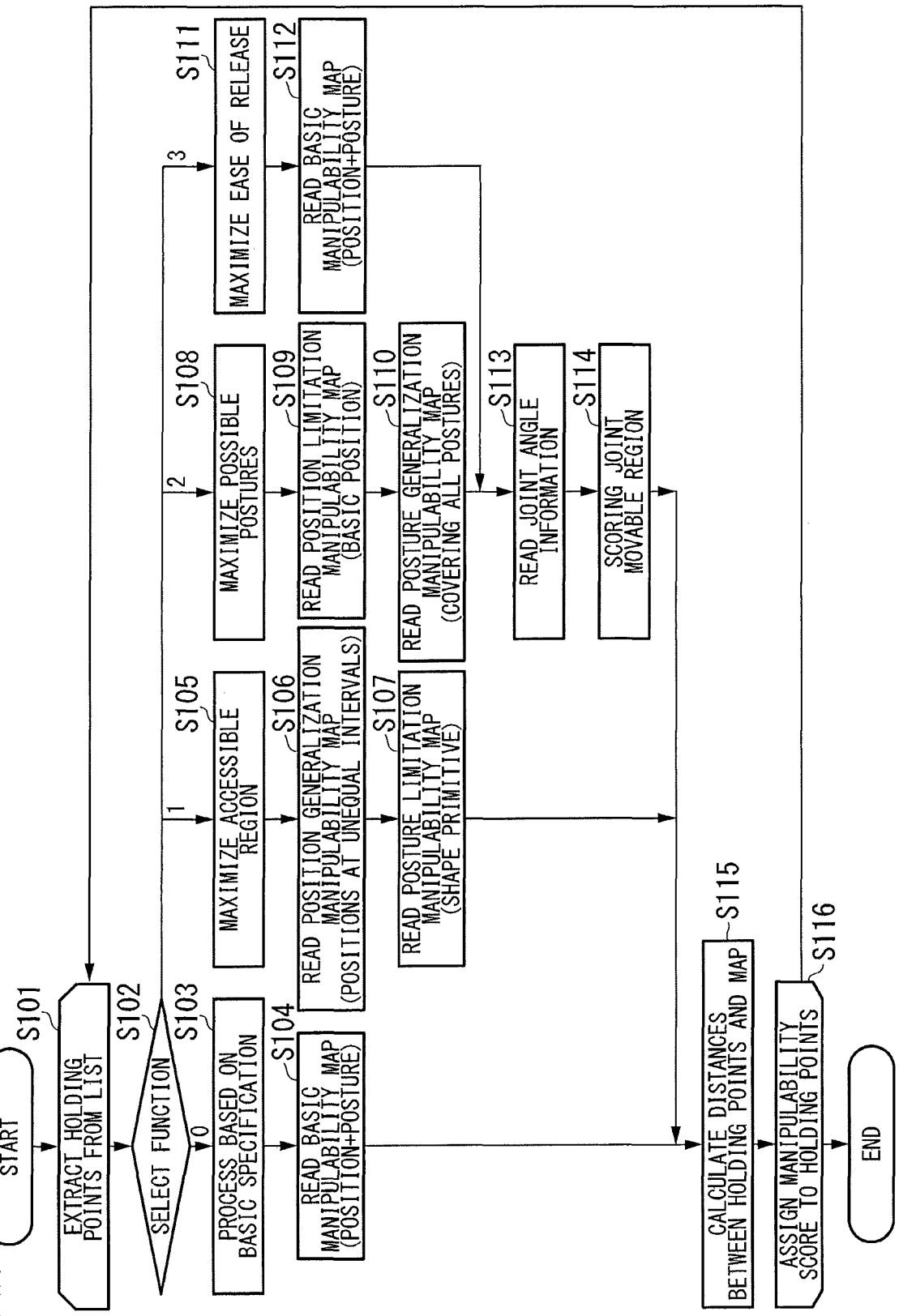
FIG. 17 is a flowchart of a process of a manipulability evaluator according to the embodiment.

FIG. 17 is a flowchart of the processing of the manipulability evaluator according to the present embodiment. In the example shown in FIG. 17, it is assumed that a plurality of manipulability maps are stored in the manipulability map storage 341.

(Step S101) The manipulability evaluator 354 extracts one holding point from the holding point list. The manipulability evaluator 354 repeats the processing of Steps S101 to S116 for all the holding points.

(Step S102) The manipulability evaluator 354 selects a function in accordance with a type of the holder 200 attached to the moving mechanism 100, for example. In the case in which a measure is taken with a basic specification, the manipulability evaluator 354 selects the function 0 and proceeds to the process of Step S103. In the case in which a measure is taken by maximizing the accessible region even if the possible postures are limited to some extent, the manipulability evaluator 354 selects the function 1 and proceeds to the process of Step S105. In the case in which a measure is taken by maximizing the possible postures of the moving mechanism 100 and the holder 200, the manipulability evaluator 354 selects the function 2 and proceeds to the process of Step S108. In the case in which a measure is taken by maximizing the ease of release when the object O is released to the movement destination container B2, the manipulability evaluator 354 selects the function 3 and proceeds to the process of Step S111.

(Step S103) The manipulability evaluator 354 selects the measure based on the basic specification. After the processing, the manipulability evaluator 354 proceeds to the process of Step S104.

(Step S104) The manipulability evaluator 354 reads a basic manipulability map from the manipulability map storage 341. The basic manipulability map is a map in which the position manipulability map and the posture manipulability map are integrated. After the processing, the manipulability evaluator 354 proceeds to the process of Step S115.

(Step S105) The manipulability evaluator 354 selects a measure for maximizing the accessible region. When this function is selected, an access rate to the movement source B1 end increases. This function selection is effective when a wider region is to be accessed, for example, when an offset hand or the like is used as the holder 200. After the processing, the manipulability evaluator 354 proceeds to the process of Step S106.

(Step S106) The manipulability evaluator 354 reads a position generalization manipulability map from the manipulability map storage 341. The position generalization manipulability map is a manipulability map for positions, in which reachable positions are at irregular intervals. After the processing, the manipulability evaluator 354 proceeds to the process of Step S107.

(Step S107) The manipulability evaluator 354 reads the posture limitation manipulability map from the manipulability map storage 341. The posture limitation manipulability map is a shape primitive, that is, a map in which shapes are limited and postures are limited, thereby classifying geometric shapes on the basis of curvatures. After the processing, the manipulability evaluator 354 proceeds to the process of Step S115.

(Step S108) The manipulability evaluator 354 selects a measure that maximizes possible postures. For example, when the holding point is in the vertical direction with respect to the movement source B1, the above function selection can improve a holding success rate of characteristic postures in a limited range. After the processing, the manipulability evaluator 354 proceeds to the process of Step S109.

(Step S109) The manipulability evaluator 354 reads a position limitation manipulability map from the manipulability map storage 341. The position limitation manipulability map is a manipulability map at basic positions. After the processing, the manipulability evaluator 354 proceeds to the process of Step S110.

(Step S110) The manipulability evaluator 354 reads a posture generalization manipulability map from the manipulability map storage 341. The posture generalization manipulability map is a map covering postures. After the processing, the manipulability evaluator 354 proceeds to the process of Step S113.

(Step S111) The manipulability evaluator 354 selects a measure that maximizes ease of release. This function selection can improve, for example, a success rate toward ease of operation after picking. This guarantees that joint angles of the moving mechanism 100 (arm) when designated positions and postures are represented are near a center of the entire movable range. Thus, this function selection has an effect of increasing availability when the next operation is performed. After the processing, the manipulability evaluator 354 proceeds to the process of Step S112.

(Step S112) The manipulability evaluator 354 reads the basic manipulability map from the manipulability map storage 341. After the processing, the manipulability evaluator 354 proceeds to the process of Step S113.

(Step S113) The manipulability evaluator 354 acquires joint angle information at the time of holding via the acquirer 320. In the case in which a measure of maximizing the accessible region is taken, since postures are limited (for example, to a horizontal state), the joint angle information is not acquired. After the processing, the manipulability evaluator 354 proceeds to the process of Step S114.

(Step S114) The manipulability evaluator 354 calculates a score of a joint movable region with respect to the holding point selected in step S101 on the basis of each manipulability of each read manipulability map and the read joint angle information. After the processing, the manipulability evaluator 354 proceeds to the process of Step S115.

(Step S115) The manipulability evaluator 354 calculates distances between the holding point extracted in Step S101 and each of the position and the posture in the movement source B1 in each of the read manipulability maps. Specifically, when a measure is taken on the basis of the basic specification, the manipulability evaluator 354 calculates a norm between the position of the holding point and the nearest point in the basic manipulability map as a distance f1, and calculates a norm between the posture of the holding point and the closest posture in the basic manipulability map as a distance f2. When a measure of maximizing the accessible region is taken, the manipulability evaluator 354 calculates a norm between the position of the holding point and the nearest point in the position generalization manipulability map as a distance f3, and calculates a curvature as f4 from an object surface including the holding point and the posture limitation manipulability map (shape primitive). When a measure of maximizing the possible postures is taken, the manipulability evaluator 354 calculates a norm between the position of the holding point and the nearest point in the position limitation manipulability map as the distance f3, and calculates a norm between the posture of the holding point and the nearest posture in the posture generalization manipulability map as the distance f4. When a measure of maximizing the ease of release is taken, the manipulability evaluator 354 calculates a norm between the position of the holding point and the nearest point in the basic manipulability map as the distance 13, and calculates a norm between the posture of the holding point and the closest posture in the basic manipulability map as the distance f4. The manipulability evaluator 354 calculates a value indicating how much room is left from the center of the joint movable region as 15.

(Step S116) The manipulability evaluator 354 calculates a manipulability score for the holding point extracted in Step S101. The manipulability evaluator 354 calculates a manipulability score on the basis of the distance between the holding point and the position on the manipulability map, the score of the joint movable region, and the manipulability associated with the manipulability map. Subsequently, the manipulability evaluator 354 gives the calculated manipulability score to the holding point extracted in step S101. Specifically, the manipulability evaluator 354 normalizes each different dimensional quantity of the distance f1 related to the position, the distance f2 related to the posture, the curvature 13 related to the shape primitive, and the value f4 related to the movable joint region, and sets functions. Next, the manipulability evaluator 354 calculates the manipulability score f by weighting each of the functions f1 to f4 and adding them as in the following equation (6).

[Equation 6]

$$f = w1 \times f1 + w2 \times f2 + w3 \times f3 + w4 \times f4 \quad (6)$$

In Equation (6), w1 is the weight of f1, w2 is the weight of f2, w3 is the weight of f3, and w4 is the weight of f4. The manipulability evaluator 354 calculates the manipulability score f using f1 and f2 when a measure is taken on the basis of the basic specification. The manipulability evaluator 354 calculates the manipulability score f using f1 and f3 when a measure of maximizing the accessible region is taken. The manipulability evaluator 354 calculates the manipulability score f using f1, f2, and f4 when a measure of maximizing the possible postures is taken. The manipulability evaluator 354 calculates the manipulability score f using f1 and f2 when a measure of maximizing the ease of release is taken.

In the present embodiment, as shown in FIG. 17, the manipulability map used when evaluating the holding position is selected in accordance with the function (for example, in accordance with a type of hand or the holding object O). In this way, in the present embodiment, the posture and the position are limited by selecting the manipulability map. However, since the information included in the manipulability map is also limited, a search time of the manipulability map corresponding to the candidate holding points can be reduced. According to the present embodiment, the posture and the position are limited. However, since the information included in the manipulability map is also limited, the information in the manipulability map can be reduced.

Next, a high-speed search process for the holding points in the manipulability map will be described.

The evaluation of whether or not the robot can represent the positions and the postures which are the candidate holding points is required to be able to be executed online. The manipulability map is generated off-line. The processing of the holding plan needs to be executed in real time and processed in the order of ms. If the manipulability map is expressed in six dimensions, the number of searches becomes enormous and the processing takes a long time, and therefore high-speed search processing is required. For this reason, in the example described below, the manipulability map is divided into a three-dimensional position and a three-dimensional posture, and a fast nearest point search is performed on each map to realize real-time processing. This makes it possible to speed up the determination of the posture at the time of picking.

Figure 18:
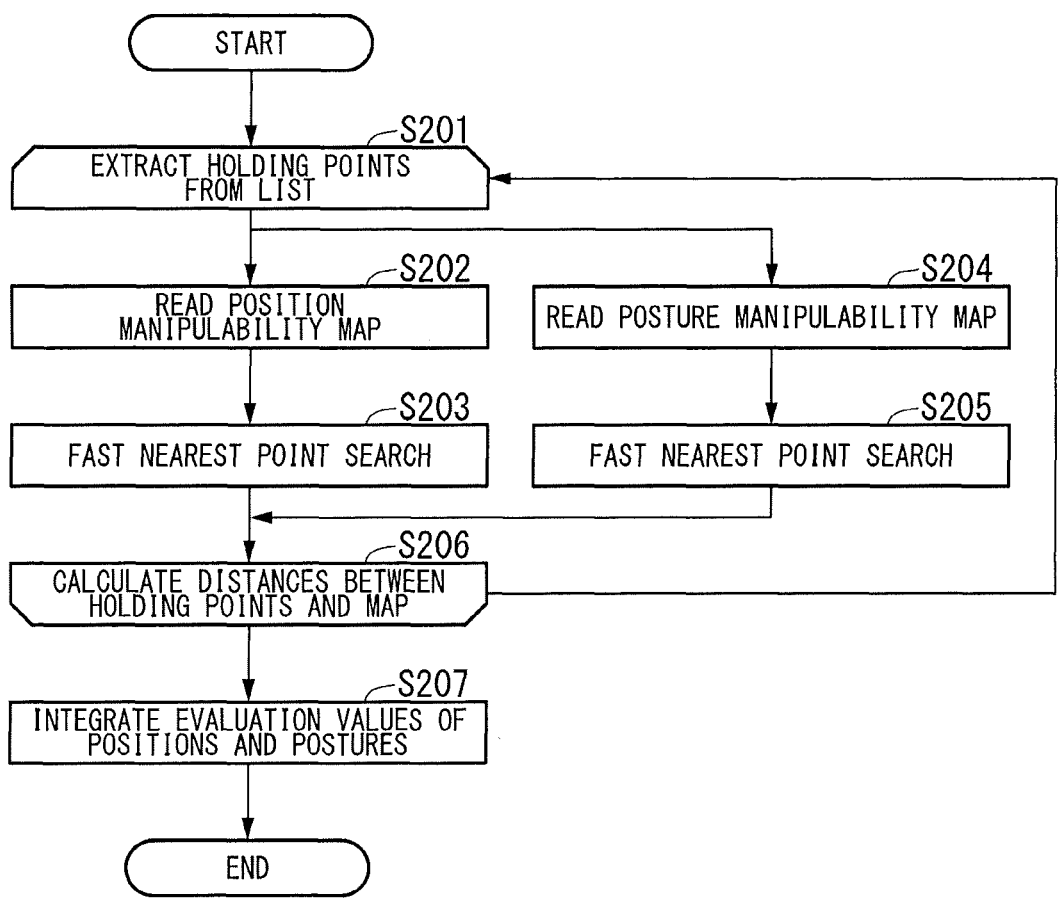
FIG. 18 is a flowchart of a high-speed search process for a holding point in the manipulability map according to the embodiment.

FIG. 18 is a flowchart of a high-speed search process for a holding point in the manipulability map according to the present embodiment.

(Step S201) The manipulability evaluator 354 extracts one holding point from the holding point list. The manipulability evaluator 354 performs the processing of Steps S202 to S203 and the processing of Steps S204 to S205, for example, in parallel.

(Step S202) The manipulability evaluator 354 reads the position manipulability map. After the processing, the manipulability evaluator 354 proceeds to the process of Step S203.

(Step S203) The manipulability evaluator 354 performs a fast nearest point search on the position manipulability map using the extracted holding points. The fast nearest point search is, for example, a search using a fast library for approximate nearest neighbors (FLANN) which is a fast approximate calculation algorithm of a K neighbor search method. After the processing, the manipulability evaluator 354 proceeds to the process of Step S206.

(Step S204) The manipulability evaluator 354 reads the posture manipulability map. After the processing, the manipulability evaluator 354 proceeds to the process of Step S205.

(Step S205) The manipulability evaluator 354 performs the fast nearest point search on the posture manipulability map using the extracted holding points. After the processing, the manipulability evaluator 354 proceeds to the process of Step S206.

(Step S206) The manipulability evaluator 354 calculates distances between the holding point extracted in Step S201 and each position in the read manipulability map. As described in Step S115 of FIG. 17, the manipulability evaluator 354 calculates the distance between the position of the holding point and the position on the map, and the distance between the posture of the holding point and the posture on the map. Subsequently, on the basis of the calculated result, the manipulability evaluator 354 assigns a score (evaluation value) of the position with respect to the holding point using the manipulability map, and assigns a score (evaluation value) of the posture with respect to the holding point using the manipulability map. When all the holding points have not been extracted, the manipulability evaluator 354 returns to the process of Step S201. When all the holding points have been extracted, the manipulability evaluator 354 proceeds to the process of Step S207.

(Step S207) The manipulability evaluator 354 integrates the manipulability score assigned in Step S203 and the manipulability score assigned in Step S205 by normalizing them as shown in Equation (6) and adding them using the weights.

Next, a method of generating the manipulability map and visualization will be described.

Figure 19:
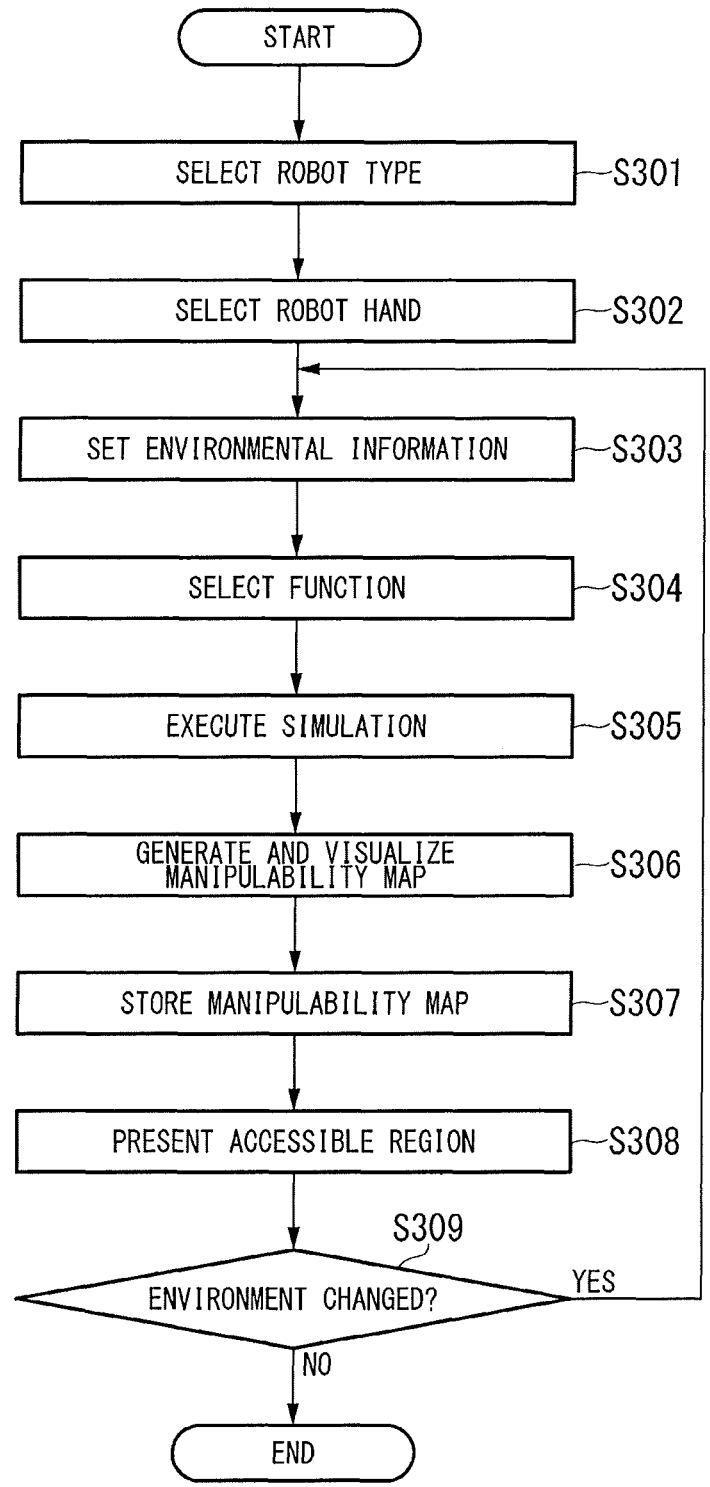
FIG. 19 is a flowchart of a method of generating the manipulability map and a visualization process according to the embodiment.
Figure 20:
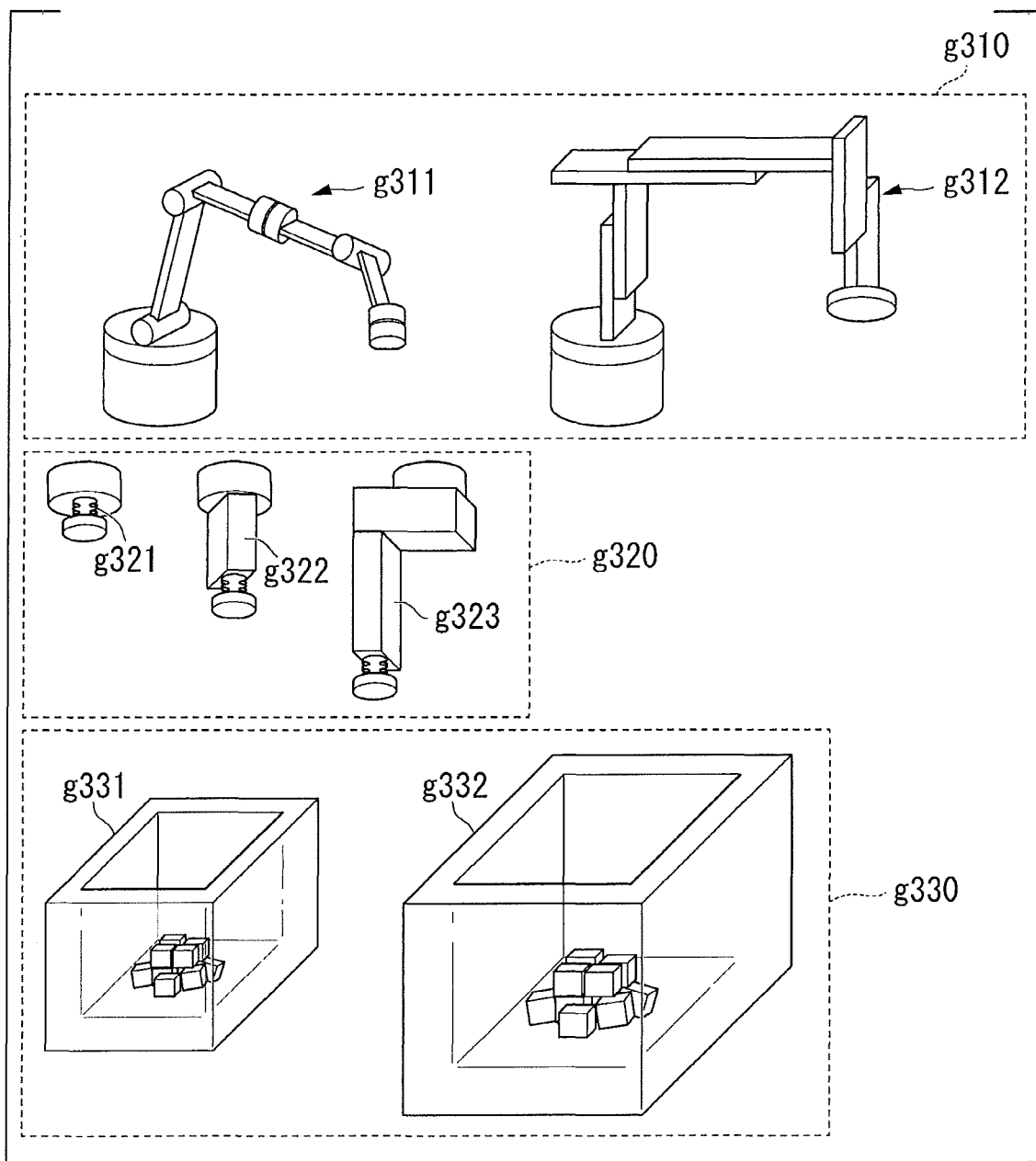
FIG. 20 is a diagram showing an example of a model presented on a display device when the manipulability map according to the embodiment is generated.

FIG. 19 is a flowchart of a method of generating the manipulability map and a visualization process according to the present embodiment. FIG. 20 is a diagram showing an example of a model presented on the display device 400 when the manipulability map according to the present embodiment is generated. In FIG. 20, a diagram of a region indicated by a reference numeral g310 is an example of a model presented at the time of selecting a robot type. A reference numeral g311 is a model of a first type robot, and a reference numeral g312 is a model of a second type robot. A diagram of a region indicated by a reference sign g320 is an example of a model presented at the time of selecting a robot hand (holder 200). A reference sign g321 is a model of a first type robot hand, a reference sign g322 is a model of a second type robot hand, and a reference sign g323 is a model of a third type robot hand. A diagram of a region indicated by a reference sign g330 is an example of a model of the movement source B1 presented at the time of setting environmental information. A reference sigh g331 is a model of a first type movement source B1, and a reference sign g332 is a model of a second type movement source B1.

(Step S301) The manipulability map generator 330 selects a robot type on the basis of the operation result of the user operating the operator 310. The robot type is, for example, a 3-axis robot arm, a 6-axis vertical articulated robot arm, or the like. The manipulability map generator 330 reads image information of a selectable robot type from the visualization model DB 344 of the storage 340, and outputs the read robot type image information to the image generator 370. The image generator 370 displays images of the robot types (for example, g310 in FIG. 15) on the display device 400 on the basis of the received image information of the robot types.

(Step S302) The manipulability map generator 330 selects a robot hand on the basis of the operation result of the user operating the operator 310. The robot hand is, for example, a hand that extends a movable range accessible in the z-axis direction, a hand that extends a movable range in the xyz-axes directions, or the like. The manipulability map generator 330 reads image information of selectable robot hands from the visualization model DB 344 of the storage 340, and outputs the read image information of the robot hands to the image generator 370. The image generator 370 displays images of the robot hands (for example, g320 in FIG. 20) on the display device 400 based on the received image information of the robot hands.

(Step S303) The manipulability map generator 330 sets environmental information on the basis of the operation result of the user operating the operator 310. The environmental information is information about the movement source B1 to be used (a name or identification information of the movement source B1, location information where the movement source B1 is disposed, and the like). The manipulability map generator 330 may be configured to acquire the environmental information on the basis of images captured by operating the first detector 11 via the management device 13.

(Step S304) The manipulability map generator 330 selects a function on the basis of the operation result of the user operating the operator 310. The selected function is, for example, at least one of the measure based on the basic specification, the measure of maximizing the accessible region, the measure of maximizing the possible postures, and the measure of maximizing the ease of release, as described with reference to FIG. 17.

(Step S305) The manipulability map generator 330 performs a simulation on the movement source B1 using the information stored in the visualization model DB 344 of the storage 340 on the basis of the results set and selected in Steps S301 to S304. The manipulability map generator 330 simulates a state (position and posture) of the handling device 10 using the information stored in the visualization model DB 344 of the storage 340.

(Step S306) The manipulability map generator 330 generates the manipulability map by calculating the manipulability of each position in the movement source B1 on the basis of the simulation. Subsequently, the manipulability map generator 330 outputs information on the generated manipulability map to the image generator 370. Subsequently, the image generator 370 generates images of the manipulability map on the basis of the acquired information of the manipulability map, and causes the display device 400 to display the generated images of the manipulability map thereon.

(Step S307) The manipulability map generator 330 causes the manipulability map storage 341 to store the generated manipulability map.

(Step S308) The manipulability map generator 330 generates images indicating the accessible region on the basis of the operation result of the user operating the operator 310, and causes the generated images to be displayed on the display device 400. The accessible region is a region in which the manipulability is not 0.

(Step S308) The manipulability map generator 330 determines whether the function has been changed on the basis of the operation result of the user operating the operator 310. When the function has been determined to be changed (Step S308; YES), the manipulability map generator 330 returns to the process of Step S303. When the function has not been determined to be changed (Step S308; NO), the manipulability map generator 330 ends the process.

Next, an example of an image displayed on the display device 400 when the manipulability map is generated will be described.

Figure 21:
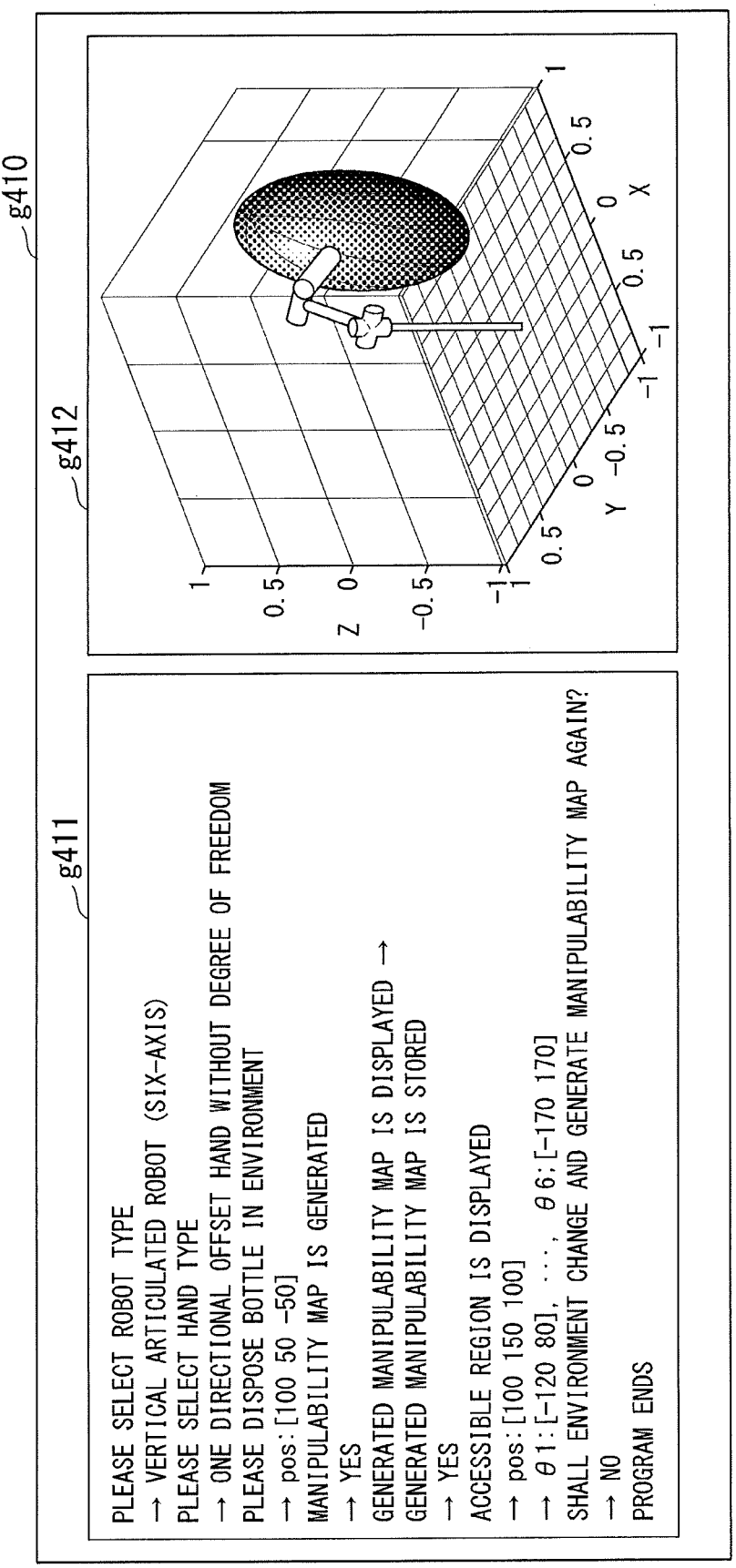
FIG. 21 is a diagram showing an example of an image displayed on the display device when the manipulability map according to the embodiment is generated.

FIG. 21 is a diagram showing an example of an image g410 displayed on the display device 400 when the manipulability map according to the present embodiment is generated. In FIG. 21, an image indicated by a reference numeral g411 is a display example of a text in each process in FIG. 19. An image indicated by a reference numeral g412 is an example of the accessible region.

In the example shown in FIG. 21, the image of the accessible region is displayed as g412. However, the image may configured to be switched to images of selectable robot types, images of selectable robot hands, image of selectable functions, images of manipulability maps, or the like in accordance with processing procedures.

In the process of FIG. 15, it may be possible to select whether or not to generate the manipulability map as indicated by the reference numeral g411 in FIG. 21. In the process of FIG. 19, it may be possible to select whether or not the manipulability map is stored as indicated by the reference numeral g411 in FIG. 21.

As described above, in the present embodiment, the manipulability map is generated and the holding plan in which the amount of the accessible region and the possible postures can be changed for the target region is generated.

Thus, according to the present embodiment, for example, by defining the function map that can evaluate the position and the posture separately to speed up the search for the posture, the speed of holding a work can be increased. Alternatively, according to the present embodiment, for example, by defining the functional map that can limit and evaluate the position or the posture to speed up the search for the posture, the speed of holding a work can be increased.

A program for realizing all or a part of the functions of the controller 300 in the present invention may be recorded on a computer-readable recording medium to cause a computer system to read and execute the program recorded on the recording medium, thereby performing all or part of processes performed by the controller 300. The "computer system" as used herein includes an operating system (OS) and hardware such as peripheral devices. The "computer system" also includes a worldwide web (WWW) system provided with a website providing environment (or display environment). The "computer-readable recording medium" refers to a portable medium such as a flexible disk, a magneto-optical disk, a read-only memory (ROM), and a CD-ROM, and a storage device such as a hard disk built in a computer system. The "computer-readable recording medium" also includes those holding a program for a certain period of time, such as a volatile memory (RAM) inside a computer system that becomes a server or a client when the program is transmitted via a network such as the Internet or a communication line such as a telephone line.

The program may be transmitted from a computer system storing the program in a storage device or the like to another computer system via a transmission medium or by a transmission wave in the transmission medium. The "transmission medium" for transmitting the program refers to a medium having a function of transmitting information, such as a network (communication network) such as the Internet or a communication channel (communication line) such as a telephone line. The program may be ones for realizing a part of the functions described above. It may be a so-called differential file (differential program) by which the above-described functions can be realized in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handling device comprising:
   an arm including at least one joint;
   a holder attached to the arm and configured to hold an object;
   a storage storing a function map including at least one of information about holdable positions of the holder and information about possible postures of the holder;
   a detector configured to detect information about the object; and
   a controller configured to generate holdable candidate points on the basis of the information detected by the detector, to search the function map for a position in an environment in which the object is present, the position being associated with the generated holdable candidate points, and to determine a holding posture of the holder on the basis of the searched position,
   wherein the function map associates a manipulability with each position in the environment in which the object is present,
   wherein the manipulability is a parameter calculated from at least one joint angle of the holder, and
   wherein the storage stores at least one of a function map of the information about positions, a function map of the information about postures, a function map obtained by integrating the function map of the information about positions and the function map of the information about postures, a function map which maximizes accessible regions of the holder, a function map which maximizes possible postures of the holder, and a function map which maximizes ease of release of the object after the object is held.

2. The handling device according to claim 1, wherein the storage stores, for at least one of the information about positions and the information about postures, the function map in which the positions in the environment are at equal intervals or the function map in which the positions are at unequal intervals.

3. The handling device according to claim 1,
   wherein the storage stores a function map of the information about postures in which the postures are limited, and
   wherein the controller is further configured to define characteristic curvature shapes among surface shapes of the object as a surface shape primitive, to analyze a surface shape of the object on the basis of the information detected by the detector, to estimate a position that is the surface shape primitive on the surface of the object on the basis of the analysis results, to search the function map of the information about postures in which the postures are limited for a position in the environment in which the object is present, the position being associate with the estimated position, and to determine a holding posture of the holder on the basis of the searched position.

4. The handling device according to claim 1, wherein the controller is further configured to select at least one function map from the plurality of function maps stored in the storage on the basis of a type of the holder.

5. The handling device according to claim 1, wherein the controller is further configured to simulate a state of the handling device using a model, to generate an image of an accessible region of the holder on the basis of the simulated results, and to output the generated image to a display device.

6. A control device in a handling device comprising an arm including at least one joint, a holder attached to the arm and configured to hold an object, and a detector configured to detect information about the object, comprising:
   a storage storing a function map including at least one of information about holdable positions of the holder and information about possible postures of the holder; and
   a controller configured to generate holdable candidate points on the basis of the information detected by the detector, to search the function map for a position in an environment in which the object is present, the position being associated with the generated holdable candidate points, and to determine a holding posture of the holder on the basis of the searched position,
   wherein the function map associates a manipulability with each position in the environment in which the object is present,
   wherein the manipulability is a parameter calculated from at least one joint angle of the holder, and
   wherein the storage stores at least one of a function map of the information about positions, a function map of the information about postures, a function map obtained by integrating the function map of the information about positions and the function map of the information about postures, a function map which maximizes accessible regions of the holder, a function map which maximizes possible postures of the holder, and a function map which maximizes ease of release of the object after the object is held.

7. A holding method using a control device in a handling device comprising an arm including at least one joint, a holder which attached to the arm and configured to hold an object, a detector configured to detect information about the object, and a storage storing a function map including at least one of information about holdable positions of the holder and information about possible postures of the holder, the function map associating a manipulability with each position in the environment in which the object is present, the manipulability being a parameter calculated from at least one joint angle of the holder, the holding method comprising:
   generating holdable candidate points on the basis of the information detected by the detector;
   searching the function map for a position in an environment in which the object is present, the position being associated with the generated holdable candidate points; and
   determining a holding posture of the holder on the basis of the searched position,
   wherein the storage stores at least one of a function map of the information about positions, a function map of the information about postures, a function map obtained by integrating the function map of the information about positions and the function map of the information about postures, a function map which maximizes accessible regions of the holder, a function map which maximizes possible postures of the holder, and a function map which maximizes ease of release of the object after the object is held.

* * * * *